(12) United States Patent
Moriyama et al.

(10) Patent No.: US 6,466,991 B1
(45) Date of Patent: Oct. 15, 2002

(54) DATA COMMUNICATION METHOD

(75) Inventors: Koichi Moriyama, Kanagawa; Seiji Murata, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/055,669

(22) Filed: Apr. 7, 1998

(30) Foreign Application Priority Data

Apr. 10, 1997 (JP) .............................................. 9-092446

(51) Int. Cl.[7] .................................................. G06F 9/54
(52) U.S. Cl. ...................... 709/315; 709/316
(58) Field of Search ................................ 709/310, 400, 709/100–108, 315, 316

(56) References Cited

U.S. PATENT DOCUMENTS

| | | | | |
|---|---|---|---|---|
| 5,124,909 A | * | 6/1992 | Blakely et al. | 709/203 |
| 5,475,817 A | * | 12/1995 | Waldo et al. | 709/303 |
| 5,566,302 A | * | 10/1996 | Khalidi et al. | 709/201 |
| 5,577,251 A | * | 11/1996 | Hamilton et al. | 709/101 |
| 5,724,503 A | * | 3/1998 | Kleinman et al. | 709/316 |
| 5,887,171 A | * | 3/1999 | Tada et al. | 707/10 |
| 5,966,663 A | * | 10/1999 | Gleason | 455/466 |
| 5,999,988 A | * | 12/1999 | Pelegri-Llopart et al. | 709/304 |
| 6,157,959 A | * | 12/2000 | Bonham et al. | 709/313 |
| 6,167,458 A | * | 12/2000 | Lim et al. | 709/316 |
| 6,226,692 B1 | * | 5/2001 | Miloushev et al. | 709/316 |
| 6,272,557 B1 | * | 8/2001 | Lim et al. | 709/315 |
| 6,389,484 B1 | * | 5/2002 | Lim et al. | 709/316 |

FOREIGN PATENT DOCUMENTS

WO           95/27248           10/1995

OTHER PUBLICATIONS

A. Chatterjee, Futures: A Mechanism for Concurrency Among Objects, Proceedings of SuperComputing '89, pp. 562–67 (Nevada, Nov. 13–17, 1989) (sponsored by IEEE Computer Society).*
R. Chandra et al., COOL: An Object–Based Language for Parallel Programming, Computer, vol. 27, No. 8, pp. 13–26 (Aug. 1994).*

* cited by examiner

Primary Examiner—St. John Courtenay, III
Assistant Examiner—Van Hoa Nguyen
(74) Attorney, Agent, or Firm—Jay H. Maioli

(57) ABSTRACT

A method for data communication between objects or between object-oriented programming systems, such as object-oriented operating systems (OS), in which transparency to different environments is presented for convenience to a programmer. In the data communication method for having communication between the object-oriented operating systems or between objects, a tag (Tag), a future (Future) and continuation (Continuation) are handled as a tag (Tag) for controlling the synchronization and parallelism of communication between objects proper to different communication mechanisms having different properties or interfaces. These tags are communicated along with the communication message.

10 Claims, 21 Drawing Sheets

| COMBINATION OF LOWER 1 BIT | TAG TYPE |
|---|---|
| 00 | FUTURE OF mLocal |
| 01 | CONTINUATION OF mDrive |

DATA COMMUNICATION METHOD

BACKGROUND OF THE INVENTION

1. Field of the Invention

This invention relates to a method for data communication between objects in an object-oriented programming system, such as an object-oriented operating system (OS).

2. Description of the Related Art

Among recent software techniques, there is a so-called object-oriented technique. In a software applying the software techniques, various functions in the software are formed into modules as objects. For realizing the functions of the software in its entirety, each object has communication with other object(s).

Various systems of communication between objects may be thought of in regard to synchronization or message management methods. These systems need to be adopted responsive to various requests from particular applications. For meeting these requests, it is necessary to provide a communication mechanism between objects having properties associated with the applications, such as semantics, and associated interfaces (application programming interfaces or APIs). Meanwhile, the APIs, now discussed, mean interfaces employing the OS functions or interfaces as programming system functions.

The presence of a communication mechanism between objects having properties or interfaces is referred to as presence of an 'environment'. In an equipment or a host, only one environment may be realized, or plural different environments may be realized simultaneously. Above all, the communication between objects existing in different environments is crucial in realization of concordant operations of different environments.

There are two essential concepts furnishing the functions of sending messages to objects existing in different environments. That is, 1. the concept that interfaces or procedures furnished in sending messages to object(s) present in different environments are different from those used in sending messages to object(s) present in the same environment; and
2. the concept that the same interfaces or procedures furnished in sending messages to object(s) present in different environments can be used in sending messages to object(s) present in the same environment.

The former method can be realized relatively easily because a programmer need not be conscious of all environments such that differences in the interfaces or procedures can be absorbed by furnishing different functions depending on the differences in environments.

However, so-called transparency, that is indifference of a program code to different environments, is more desirable for programmers.

SUMMARY OF THE INVENTION

It is therefore an object of the present invention to provide a data communication method enabling transparency to different environments to be furnished to programmers.

According to the present invention, there is provided a software system in need of inter-object communication without regard to whether the OS is the same or different, in which there is provided a tag for realizing communication between software items with transparency and a software system applying the software.

By introducing the tag, a software which has realized a communication mechanism having transparency between different environments and a system for realization thereof are realized. According to the present invention, communication becomes possible even if a subject necessary for controlling the synchronization or parallelism of the inter-object communication proper to a communication mechanism differs with environments without the necessity of the objects present in the different environments becoming conscious of the differences.

Specifically, by introducing the tag for controlling the synchronization or parallelism of the inter-object communication proper to the communication mechanism having different properties or interfaces, the inter-object communication between different environments can be realized easily with transparency.

DESCRIPTION OF THE PREFERRED EMBODIMENT

Figure 1:
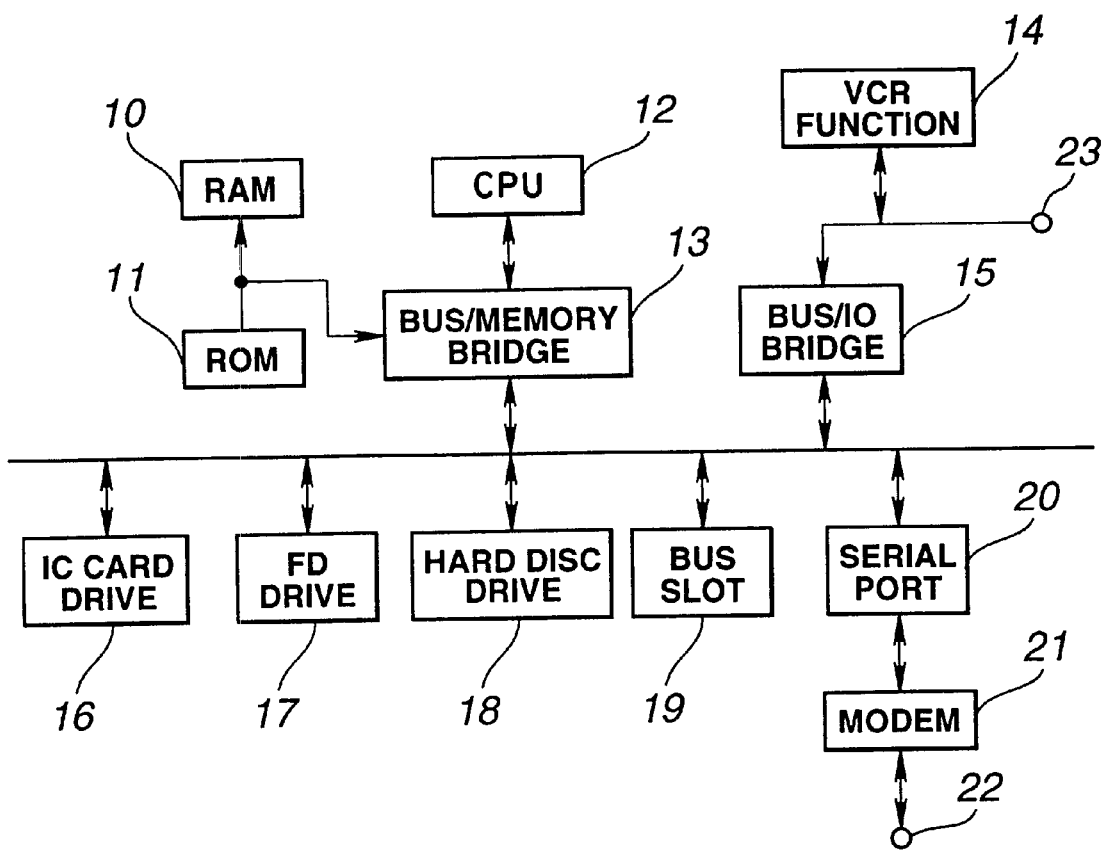
FIG. 1 is a block circuit diagram showing a schematic structure of a VCR device applied to a data communication method embodying the present invention.

Referring to the drawings, a preferred embodiment of the present invention will be explained in detail.

The data communication method embodying the present invention can be applied to a software system capable of realizing plural different environments., as one of its essential features. In the embodiment of the present invention, the environment is referred to as metaspace. In the embodiment of the present invention, the metaspace can furnish different 'environments' in connection with functions other than the communication mechanism between objects. An example of the software system capable of realizing the above-mentioned different environments is the data processing method and apparatus described in Japanese Patent Application 8-67881 proposed by the present Assignee. The data processing method is carried out by a data processing system including an application program constituted by plural objects, an execution environment prescribing the operation of the application program constituted by plural objects, a server having an application program interface prescribing the interface between the application program and the execution environment and a client downloading the application program from the server. When downloading the application program to the client, the server checks whether or not the client has the execution environment for the downloaded application program and is responsive to the results of check to download the program to the client.

FIG. 1 shows an example of a device structure for carrying out the data communication method embodying the present invention.

The device of FIG. 1 is a video cassette recorder (VCR device) for recording/reproducing signals using a video cassette comprised of a cassette and a video tape housed therein. Of course, the present invention can be applied to an audio visual equipment (AV equipment) other than the VCR device, office equipments or to a computer device in general.

In the VCR device of FIG. 1, a VCR function unit 14 mainly functions as a video cassette recorder recording/reproducing data using the video cassette. The data recorded/reproduced on the video cassette by the VCR function unit 14 is sent to other components of the device via bus/IO bridge 15 and is also sent out via terminal 23 to outside. The central processing unit (CPU) 12 is a controller controlling various parts via a bus/memory bridge 13. A random access memory (RAM) 10 is of smaller capacity and has a work area. A read-only memory (ROM) 11 has stored therein a program concerning basic functions and a program for OS as so termed in the present invention. That is, the CPU 12 controls various parts based on the program stored in the ROM 11 and uses the RAM 10 as a work area.

The IC card drive 16 has a slot into which is inserted an IC card, as a recording medium having an integrated circuit (IC) in a card-shaped casing, and an IC card driving unit for writing/reading data on or from the IC card. A floppy disc drive 17 includes a rotational driving unit for rotationally driving the floppy disc and a head unit for recording/reproducing data on or from the floppy disc. The floppy disc drive 17 takes charge of recording of various data and installment of application software. The hard disc drive 18 includes a rotational driving unit for rotationally driving the hard disc and a head for recording/reproducing data on or from the hard disc. A bus slot 19 is an extension terminal for adding an extension board, while a serial port 20 is an input/output for having data communication with outside via a MODEM.

The VCR device is designed to give additional application software in addition to the usual VCR functions. For example, if a user intends to upgrade the version, that is to add new functions to the VCR device, additional functional units can be installed via an IC card, a floppy disc or a network such as Internet. This permits the user to upgrade the device function without re-purchasing a main body member of the VCR device. The application program is prepared by the programmer so as to be supplied to the user. It is assumed that the above software is constructed by so-called object-oriented programming software.

In the above instance, communication is occasionally required between plural different environments (metaspaces).

Figure 2:
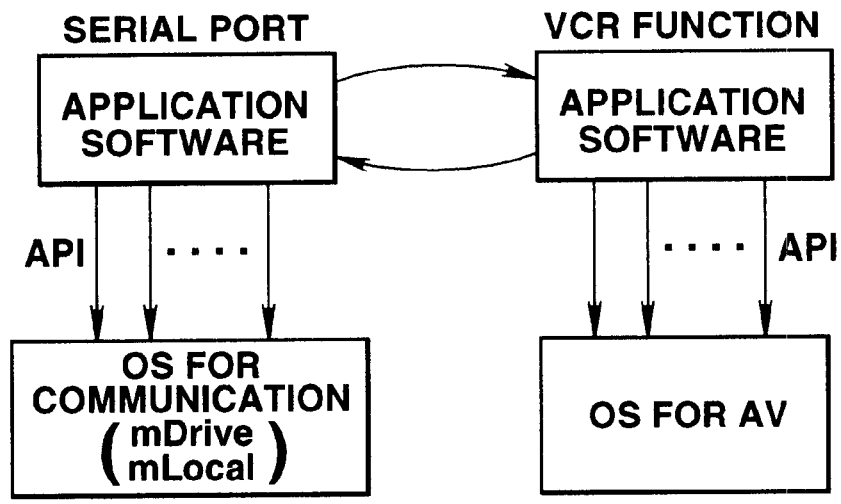
FIG. 2 illustrates the manner of communication by a VCR device embodying the present invention, OS for communication, OS for AV and API.

Referring to FIG. 2, the application software items transmitted from outside via MODEM and serial port is placed under an environment (metaspace) different from the application software present in the VCR device from the outset. These application software items can communicate with each other via a communication OS (metaspace (mLocal) or metaspace (mDrive) as later explained), OS for AV and API (Send or Reply as later explained).

First, an instance in which the 'two specified examples of the different communication mechanisms' as described above have been realized with the data communication method of the present invention is explained. The present examples are directed to a metaspace (mLocal) which has realized communication semantics (properties or structure of meanings) employing a subject termed Future and a metaspace (mDrive) which has realized communication semantics employing a subject termed Continuation.

In the present embodiment, the above-mentioned 'specified examples of the different communication mechanisms' are explained in the sequence of 'Metaspace (mlocal) communication mechanism';

'Metaspace (mdrive) communication mechanism';

'Comparison between Metaspace (mlocal) communication mechanism and Metaspace (mdrive) communication mechanism;

'System for realizing the communication mechanism in the inventive method';

'System for realizing Future and metaspace (mLocal) communication mechanism' and 'System for realizing Continuation and metaspace (mDrive) communication mechanism'.

Next, the 'basic explanation of the communication mechanism employing a tag' is made. Here, again, the metaspace (mLocal) and the metaspace (mDrive) are taken as examples. Meanwhile, the metaspace(mLocal) and the metaspace (mDrive) can be grasped as one OS or a programming system. In the present embodiment, by way of making the above 'basic explanation of the communication mechanism employing the tag', an instance in which an object A (method A::A1) performs Send and wait-For (Send+WaitFor) on the object B (method B1 (B::B1) and an instance in which the object B (method B1 (B::B1) performs Send on the object A (method A::A1) and designates the object B (method B2 (B::B2) as a continuation method are explained in this order.

An instance of realizing the communication mechanism in the method of the present invention is then explained in detail. In the present embodiment, the 'instance of realizing the communication mechanism employing a tag in the method of the present invention' is explained in the order of 'Future, Continuation and Tag';

'A system for managing a tag ID and an object delivering the tag ID (Deliverer); and 'Actual Communication between different metaspaces'.

Finally, 'other conceivable systems different in minor respects' is explained. In the present embodiment, these other conceivable systems' are explained in the order of 'a system of recognizing the tag type by the tag ID'; and 'a tag management system'.

First, the 'specified examples of different communication mechanisms' in the method of the present invention are explained.

In the present chapter, as the 'specified examples of different communication mechanisms', specified design statements and the system for realization of the communication between different objects in the data communication method of the present invention are explained. In a specified example of the present invention, next to the present chapter, the system for realizing the communication between objects between two different environments (furnishing the communication mechanism) discussed in the present chapter is explained.

'Metaspace (mLocal) Communication Mechanism'

The metaspace (mLocal) is an environment supporting the communication mechanism which is based on future (Future) (inter-object communication mechanism). This metaspace (mLocal) describes the application, of the design statements of the metaspace (mLocal) communication mechanism. The interface will be explained later.

The basic operation of the inter-object communication is herein discussed. The system for realizing this communication mechanism and the attributes of Future used in the explanation will be explained subsequently.

Figure 3:
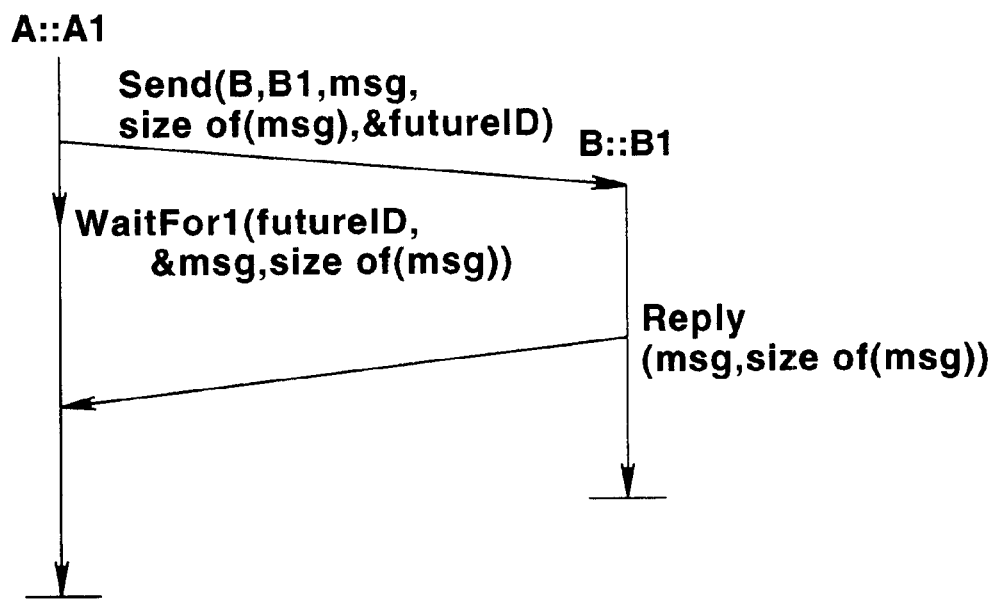
FIG. 3 illustrates a metaspace (mLocal) communication mechanism (in case WaitFor is executed before Reply).
Figure 4:
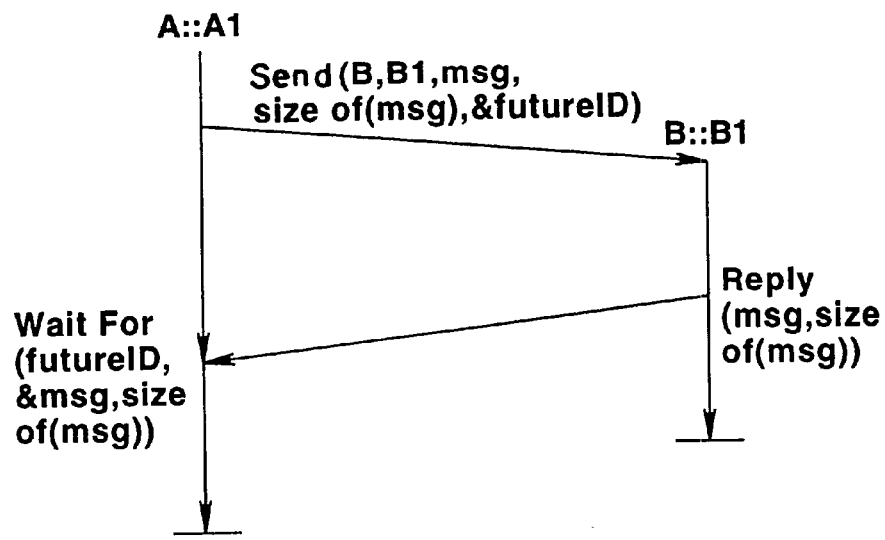
FIG. 4 illustrates a metaspace (mLocal) communication mechanism (in case Reply is executed before WaitFor).

FIGS. 3 and 4 illustrate the basic operation of the inter-object communication employing the metaspace (mLocal) communication mechanism. FIG. 3 shows an instance in which, in the metaspace (mLocal) communication mechanism, Wait-For has been executed before Reply, while FIG. 4 shows an instance in which, in the metaspace (mLocal) communication mechanism, Reply has been executed before WaitFor. In these figures, A, B denote objects, A::A1 and B::B1 denote a method A1 of the object A and a method B1 of the object B, respectively, a vertical solid-line arrow denotes execution of the methods, vertical broken-line arrows denote waiting states of the methods and the oblique solid-line arrow denotes message delivery. Meanwhile, WaitFor is one of APIs (Application programming Interface) in the metaspace (mLocal) and is used for a case in which the object A waits for the result of the object B. In WaitFor, there are provided, as arguments, future ID, reply message (&msg) as sent from the reply (Reply) and its size (sizeof(msg)). Meanwhile, the reply (Reply) is one of APIs in the metaspace (mLocal) and is used in the present embodiment for the object B to make a response to the object A. In Reply, there is provided, as argument, the reply message (msg) obtained as the result of execution of the method B1 and its size (sizeof(msg)).

In FIGS. 3 and 4, the object A sends a message to and receives a reply from the object B. First, the object A transmits a message to the object B using Send. The method B1 (B::B1) is a method started by this. In the drawing, msg is a delivered message, more precisely, its pointer. This starts the method B1 (B::B1). The methods A::A1 and B::B1 operate in parallel. It is not certain which of WaitFor of the method A1 (A::A1) and Reply of the method B1 (B::B1) is executed first. Meanwhile, Send is one of APIs in the metaspace (mLocal) and is used in the instant embodiment for transmitting a mail. In Send, there are provided, as arguments, an address (B), a selection method (B1), a message (msg) and its size (sizeof(msg)) and future ID (futureID).

Figure 5:
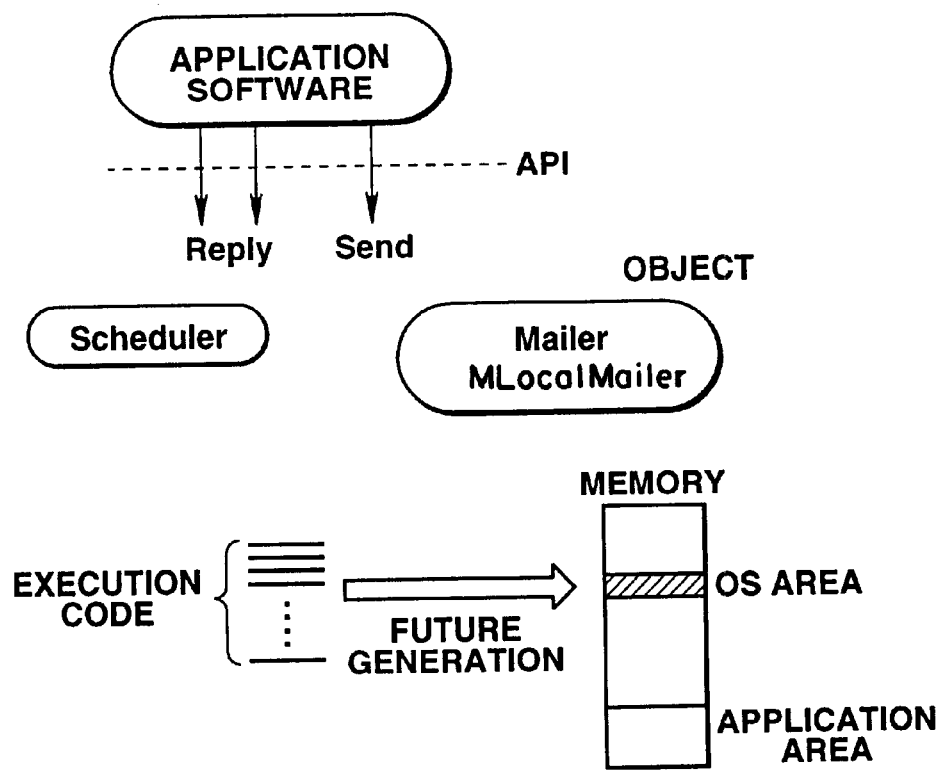
FIG. 5 illustrates the manner of communication of the application software with mailer objects or scheduler objects via API.

When the object A transmits a message to the object B, the object A receives future ID (futureID). The futureID is an ID corresponding to a subject, termed Future, generated internally in the operating system (OS) delivering a message. The term 'generating' means securing a memory area necessary for attributes constituting an object and initializing the attribute. Referring to FIG. 5, the application software is adapted for communicating via API with the object of a mailer (for example, an object of a metaobject (mLocalMailer) as later explained or an object of Scheduler similarly as later explained. The mailer is executed by the CPU based on the execution code in the object. The CPU secures a memory area required for Future in the OS area. When later the object A receives a reply to the delivery of the message, the future ID (futureID) is used for identifying which message transmission is associated with the received reply message.

Figure 6:
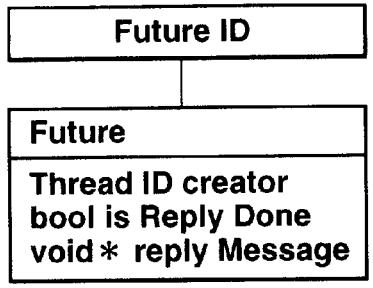
FIG. 6 illustrates Future attributes.

FIG. 6 shows attributes of Future. As these attributes, an ID for specifying the object that generated Future (ThreadID creator), a flag for checking whether or not a reply has been made (bool isReplyDone) and an area for preserving a reply message (void* replyMessage), if any, are defined. In the examples of FIGS. 3 and 4, the object A and the message (msg) are preserved in the ID (ThreadID creator) and in the reply message (void* replyMessage), respectively.

FIG. 3 shows an instance in which WaitFor has been executed before Reply. In such case, futureID is given as an argument of WaitFor. Since processing for reply for designated futureID has not been done, execution of the method A1 (A::A1) is in the stand-by state. During this time, the method B1 (B::B1) keeps on processing and executes Reply when taking the procedure for making a reply. If Reply is executed, the state of Future generated when starting the method B1 (B::B1) by the OS is observed. Since the OS can comprehend that there is a method in the stand-by state for Future, the method A1 (A::A1) is again restored to the executing state. The methods A1 (A::A1) and B1 (B::B1) again operate in parallel.

FIG. 4 shows an instance in which Reply is executed before WaitFor. When Reply is executed, the state of Future generated when the method B1 (B::B) is started by the OS is observed. Since the OS can comprehend that the transmitter of the message corresponding to Future (herein the object A) is not as yet in the stand-by state, the OS affixes a mark for Future that reply has been made. The method B1 (B::B1) keeps on executing the remaining portion. If the method A1 (A::A1) is in need of a reply from the method B1 (B::B1), the method A1 (A::A1) gives futureID as an argument of WaitFor. In this case, since processing for making a reply to designated FutureID has already been done, the method A1 (A::A1) can continue its execution.

In this manner, Future performs the role of a mediator for synchronizing two objects operating in parallel. Since it is necessary in the design statements of the metaspace (mLocal) communication mechanism for the message transmitting side to clarify for which message the reply is awaited, Future is identified by futureID. The message receiver is prescribed so that the message receiver is not in need of being conscious for which transmitter the reply is destined. Therefore, future ID is not manifested in any definite form.

'Metaspace (mDrive) Communication Mechanism'

The metaspace (mDrive) is an environment supporting the communication mechanism which is based on Continuation. This metaspace describes a device driver.

Here, the basic operation of the inter-object communication employing the metaspace (mDrive) communication mechanism is explained. The system for realizing this communication mechanism or the attributes or status transition proper to the Continuation used in the explanation will be explained in detail subsequently.

Figure 7:
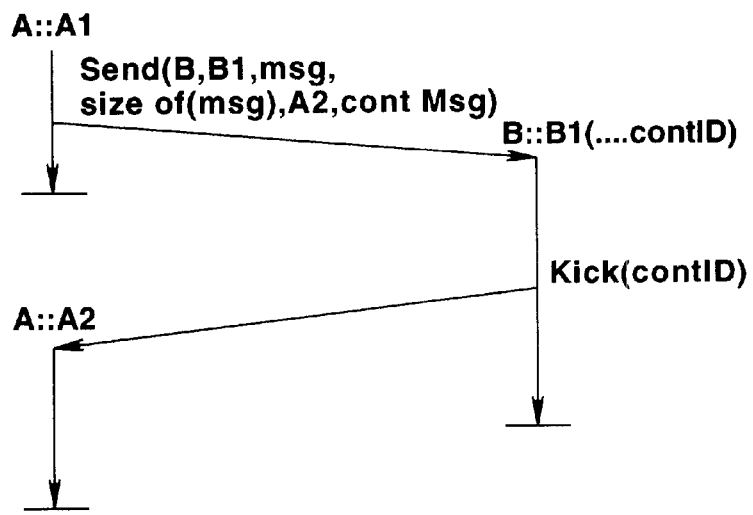
FIG. 7 illustrates a metaspace (mDrive) communication mechanism.

FIG. 7 shows the basic operation of the inter-object communication employing the metaspace (mDrive) communication mechanism. As in FIGS. 3 and 4, A, B denote objects, A::A1, A::A2 and B::B1 denote methods A1, A2 and B1 of the object A and the object B, a vertical solid-line arrow denotes execution of the methods and the oblique solid-line arrow denotes message delivery.

The object A transmits a message to the object B using Send. In the example of FIG. 7, the object A delivers the message (msg) to the method B1 (B::B1) of the object B. At this time, the object A gives a continuous method A2 and a continuous message (contMsg) to Send as fifth and sixth arguments, respectively. The method A2 (A::A2) at this time is a method of receiving a reply from the method B1 (B::B1) after end of processing of the method A1 (A::A1), while the method (contMsg) is a message assisting processing of the continuous method (A2) and is a method containing the contents delivered by the method A1 (A::A1) to the continuous method A2 (A::A2).

The OS internally generates a subject, termed Continuation, containing a continuous method and a continuous message. By generating Continuation here, an area necessary for Continuation is secured in the memory, as in the case of Future explained with reference to FIG. 5, by executing the mailer object, such as metaobject (mDriveMailer) which will be explained subsequently.

Figure 8:
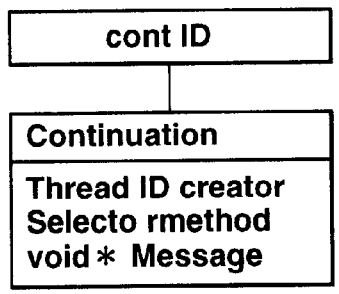
FIG. 8 illustrates attributes of Continuation.

FIG. 8 shows attributes of Continuation. The areas for storing the ID (ThreadID creator) for specifying an object that generated Continuation, continuous method (Selectormethod) and the continuous message (void*message) is defined here. The attributes of this Continuation are shown in FIG. 8 and the areas for preserving the ID (ThreadID creator) for identifying the object that generated Continuation, the selected continuous method (Selector method) and the continuous message (void*message) is defined here. In the example of FIG. 7, if the object A, method A2 and the message (contMsg) are sent by Send, the OS generates Continuation, while the object A, method A2 and the message (contMsg) are preserved in the ID (ThreadID creator), continuous method (Selector method) and continuous message (void*message), respectively.

The method B1 (B::B1) receives, in addition to the contents of the message delivered from the method A1 (A::A1), the continuation ID (contID) generated by the OS as the ID specifying the Continuation. In the example of FIG. 7, the method B1 (B::B1) receives the ID as contID. This continuation ID (ContID) is used as an argument of Kick. Meanwhile, Kick is one of APIs in the metaspace (mDrive). In the present embodiment, this continuation ID (ContID) is sent to the object A to obtain the information of the contents of the Continuation. This Kick has, as its argument, the above-mentioned continuation ID (ContID). By kicking the Continuation, the object of the metaspace (mDrive) can unconsciously start the continuous method without becoming conscious of the information contained in Continuation. In the example of FIG. 7, the method B1 (B::B1) itself kicks the received continuationID (contID) whereby the continuous method A2 (A::A2) designated by the method A1 (A::A1) is started to hand over the results of the method B1 and the continuous message (contMsg).

In this manner, the Continuation can start the continuous method without the necessity for the object receiving the message to be conscious of who transmitted the message or to whom the reply is sent (the reply can be transmitted at that time). In the design statements of the metaspace (mDrive) communication mechanism, since the OS transmits the continuation ID (contID) to the message receiving side along with the message, the continuation ID (contID) is not manifested on the transmitting side.

Comparison of Metaspace (mLocal) Communication Mechanism and Metaspace (mDrive) Communication Mechanism In the design statements of the metaspace (mLocal) communication mechanism, method execution remains parallel only since start of a method until its end. Although this semantics is not high in parallelism as compared to the design statements of the metaspace (mDrive) communication mechanism, it has merits such that it can be intuitively understood by a programmer, while the volume of the codes required to be described can be reduced easily. It is however not possible with the present design statements that an asynchronous event, such as a device driver employing interrupt, cannot be described efficiently.

In the design statements of the metaspace (mDrive) communication mechanism, the continuous method after once terminating the method can be designated. If a reply is transmitted in association with an asynchronous event, such as interrupt, the continuous method previously designated can be started by kicking the Continuation. Thus the asynchronous event, such as device driver, can be described efficiently. Although the program high in parallelism as compared to the design statements of the metaspace (mLocal) communication mechanism can be described, it has demerits such that it cannot be understood intuitively by the programmer and that the amount of the codes that need to be described tends to be increased.

System for Realizing Communication Mechanism in the Method of the Present Invention In the method of the present invention, the function furnished by the metaspace is realized by the object constituting the metaspace. Such object is termed a meta-level object or a metaobject, as contrasted to the object employing the function furnished by the metaspace. On the other hand, the object employing the function supplied by the metaspace is termed the base level object or as a base object.

As an object furnishing the functions common to the metaspaces, one termed Scheduler can be used (as a constituent element for realizing each communication mechanism, as now explained, can be used). The object Scheduler is a metaobject managing the state of an object. The design statements of the Scheduler required in the present embodiment will be explained subsequently.

On the other hand, since the communication mechanism of the metaspace (mLocal) differs from that for the metaspace (mDrive), the metaobject furnishing the functions realizing the relevant communication mechanism can be defined separately. The metaobject for realizing the message delivery in the metaspace (mLocal) communication mechanism is termed metaobject (MLocalMailer), while that for realizing the message delivery in the metaspace (mDrive) communication mechanism is termed metaobject (MDriveMailer).

The metaspace (mLocal) communication mechanism and the metaspace (mDrive) communication mechanism are realized by the metaobject (MLocalMailer), Scheduler and other modules supporting the execution thereof, and by the metaobject (MDriveMailer), Scheduler and other modules supporting the execution thereof, respectively. Here, the relation between the metaobject (MLocalMailer) and Scheduler and that between the metaobject (MDriveMailer) and Scheduler are given a scenario and the system for realizing each communication mechanism is shown. The Future and Continuation are also given attributes and the state transition thereof is shown by the scenario.

System for Realizing Communication Mechanism for Future and that for Metaspace (mLocal)

FIGS. 9 to 12 show the relation between the metaobject (MLocalMailer) and Scheduler by a scenario (flowchart).

Figure 9:
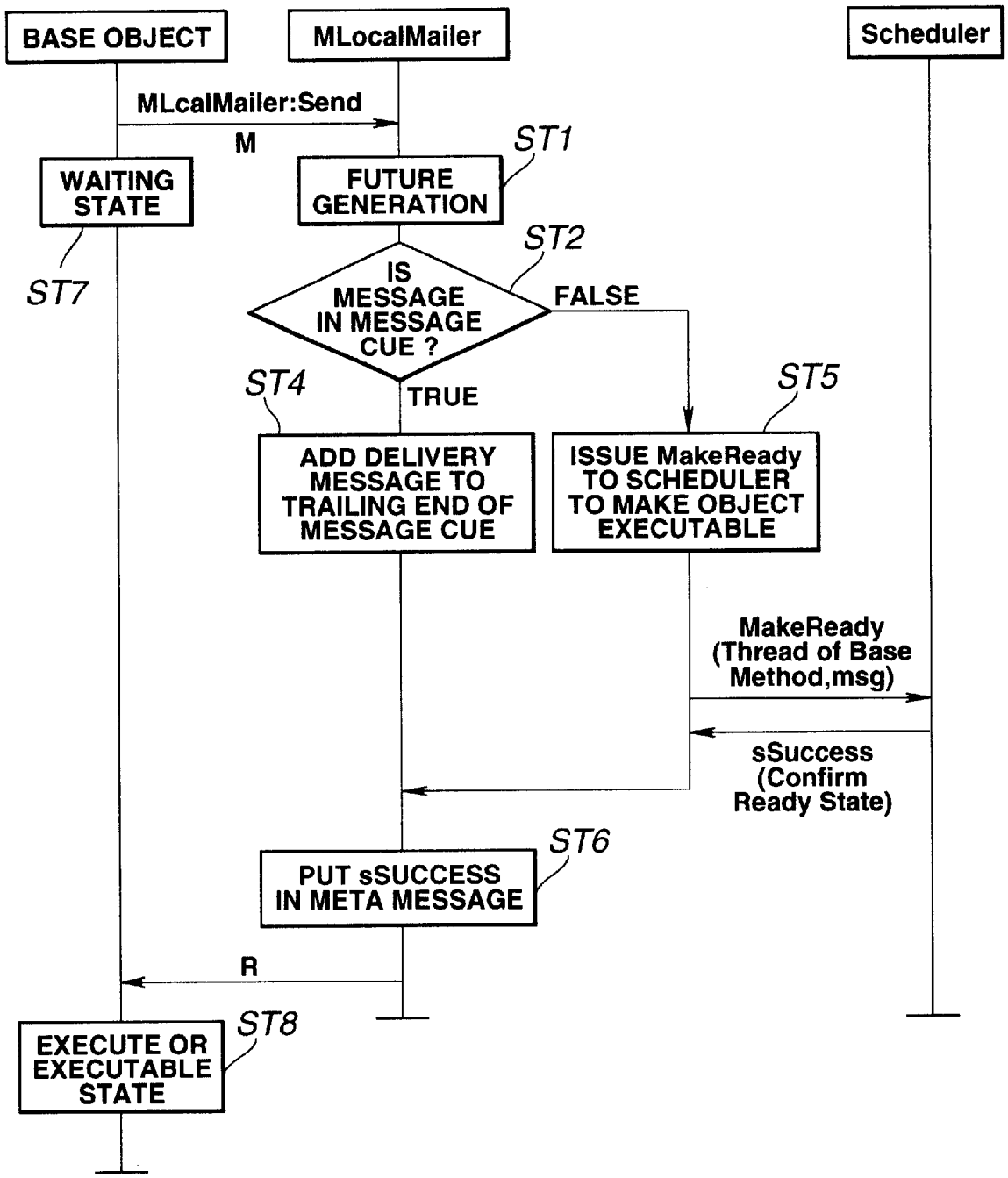
FIG. 9 illustrates the flow of procedure of the relation between the metaobject (mLocalMailer) and Scheduler (for realization of Send in metaspace (mLocal)).

FIG. 9 shows the procedure for Send of the metaspace (mLocal).

If, in FIG. 9, the base object on the metaspace (mLocal) executes Send, processing transfers to the metaobject (MLocalMailer) for the communication mechanism constituting the metaspace (mLocal), with the base object being in awaiting state (Wait), as shown at step ST7. Such transition of the processing state from the base object to the metaobject is hereinafter referred to as M (Meta Computation).

On such processing transition, the metaobject (MLocalMailer) generates future (Future) as step ST1.

Figure 13:
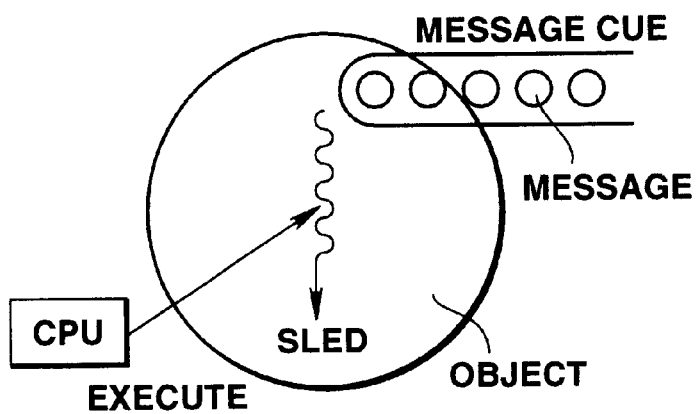
FIG. 13 illustrates a message cue.

Then, as step ST2, the state of the message cue (message array) of the objects of the address to which the message (ActiveMessage) is delivered. If, at this time, there is no message in the message cue (FALSE), the object is in the rest state (dormant if the Scheduler is in the supervising state). Thus an API MakeReady is issued to the Scheduler at step ST5 to set the execution possible state for the object (ready state if the Scheduler is supervising). The message cue is briefly explained here. Referring to FIG. 13, the CPU exploits the delivered message when executing one of the threads in the object. The message cue represents the message array and is constructed for sequentially exploiting the messages in the message cue. Meanwhile, the API MakeReady is used in order to render the object executable, while Ready and Dormant indicate the execution possible state and the resting state of the object, respectively. In the Dormant state, the object is idle and in ready to receive a message. The API MakeReady has the method and the message (msg) specifying the object as an argument (Thread of base) (object B in the present embodiment). Thus, in the present embodiment, a supervising command for specifying the base object B for sending the message (msg) to the method B is sent to the Scheduler.

On the other hand, if there is a message in the message cue (TRUE) at step ST2, the message is already delivered to the object of the address and the object is in the execution possible (Ready) state, while the object is in the course of execution (Running). Thus, at step ST4, the message is entered at the trailing end of the message cue to terminate the processing. The Future ID that can identify Future corresponding to message transmission is simultaneously managed by the message cue. These states will be explained subsequently with reference to FIG. 2.

A return value success (sSuccess) indicating the delivery end state is then placed in the metamessage (MetaMessage) and state transition is restored to the base object. The base object then is in the state of execution or in the execution possible state, as at step ST8. The metamessage (MetaMessage) is a message having a parameter (argument) required for Send when the base object on the metaspace (mLocal) performs Send.

The above-mentioned M (Meta Computation) and R (Resume) are shown in detail in the above referenced Japanese patent Application 89-67881.

Figure 10:
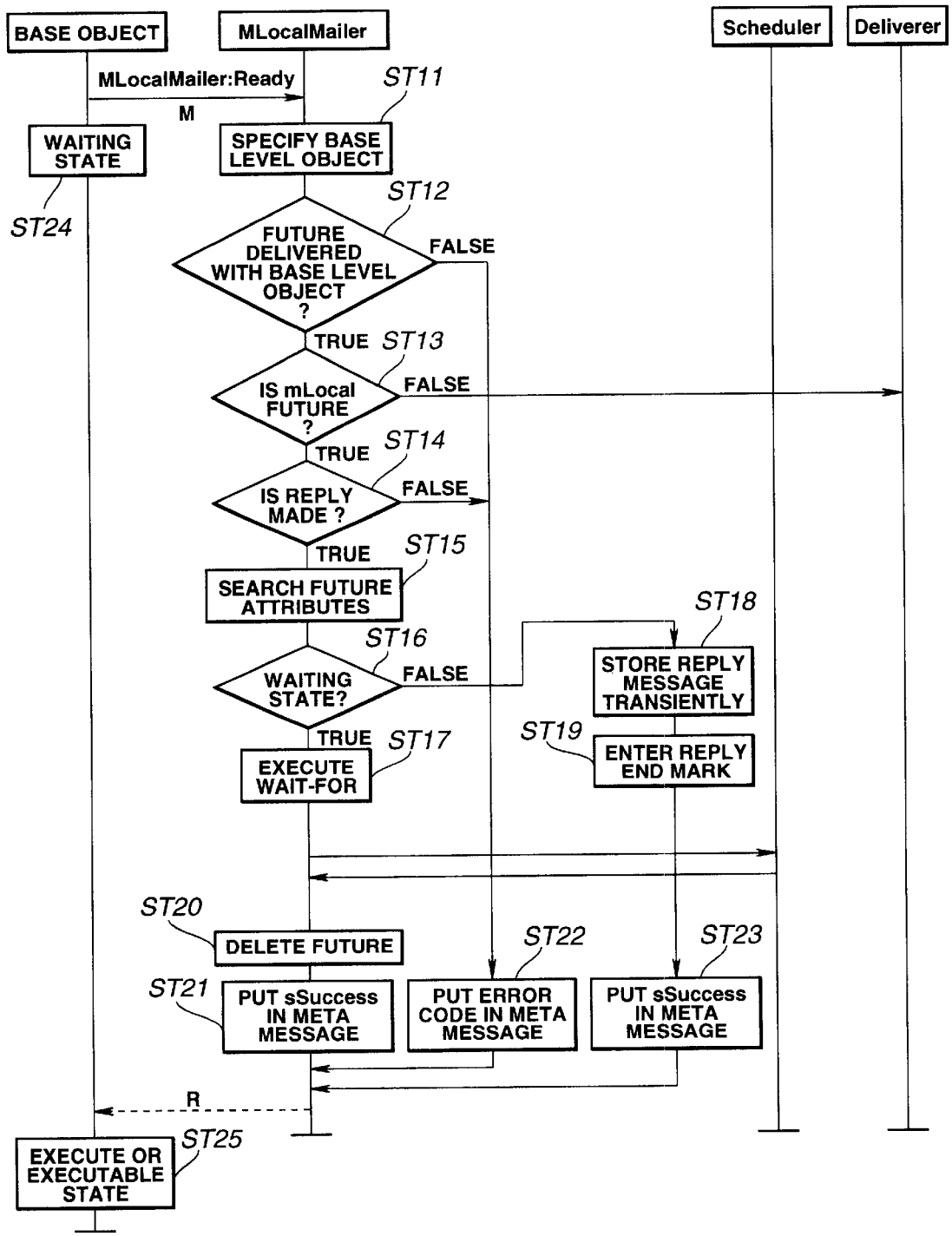
FIG. 10 illustrates the flow of procedure of the relation between the metaobject (mLocalMailer) and Scheduler (for realization of Reply in metaspace (mLocal)).

FIG. 10 shows the procedure concerning Reply by the metaobject (MLocalMailer).

Referring to FIG. 10, the metaobject (MLocalMailer) first confirms, at step ST11, which base object has made the reply (Reply). In the examples of FIGS. 3 and 4, it is confirmed that the base object B has issued the reply. For this confirmation, the function GetLast( ), for example, of API, is used in the present embodiment. However, any desired method may be used. The base object is in the Wait state as at step ST24.

Then, at step ST12 to step ST14, it is checked whether future ID sent simultaneously with the starting of the base object is really the future (Future) of the metaspace (mLocal). If the results of the steps ST12 and ST14 are false, an error is deemed to have occurred and processing transfers to step ST22. If the result of check at step ST13 is false, the state is tantamount to communication with another metaspace by a communication mechanism employing the tag as a feature of the present invention, and the metaobject (Deliverer) as later explained is asked to take over the processing.

If the result of check in the steps ST12 to ST14 is YES, the attribute (creator) of the future (Future) is checked at step ST15. At this time, the attribute (creator) includes the object which has sent the message to the base object which has made the reply (Reply). With the example of FIGS. 3 and 4, the object which has sent the message to the base object B which has made the reply is A and is preserved in an area Thread ID Creator.

Next, at step ST16, it is checked whether the object is in the waiting state (Wait). If the object is in the waiting state (Wait), the object is executing WaitFor as at step ST17. In executing WaitFor, future ID (futureID), reply message (&msg) and size (sizeof(msg)) are had as arguments. The future ID (futureID) currently handled is equal to future ID (futureID) given to WaitFor and the message (msg) sent by the reply (Reply) is given the argument (&msg), as explained with reference to FIGS. 3 and 4. The object in the waiting state is again in the execution possible state by the API MakeReady. That is, in the examples of FIGS. 3 and 4, the object A is restored to the execution possible state.

Since the method of the address is in the waiting state, designation and hence UNDEFINE (undefine) or message is unnecessary and hence are NULL.

On the other hand, if at step ST16 the attribute Creator is not in the waiting state, WaitFor is not as yet executed. Thus, at this time, the metaobject (MLocalMailer) sets the attribute (isReplyDone) of future (Future) at step ST19 to enter a mark for reply completion. If necessary, the reply message is transiently preserved in the message (message) as at step ST18.

Subsequently, future (future) is deleted at step ST20 and a return value success (sSuccess) of delivery completion is entered at step ST21 in a metamessage (MetaMessage). At step ST22, a return value specifying an error is entered in the metamessage (MetaMessage) and, at step ST23, a return value success (sSuccess) for delivery completion is entered into the metamessage (MetaMessage). The base object then enters an executing state or an execution possible state as at step S25.

Figure 11:
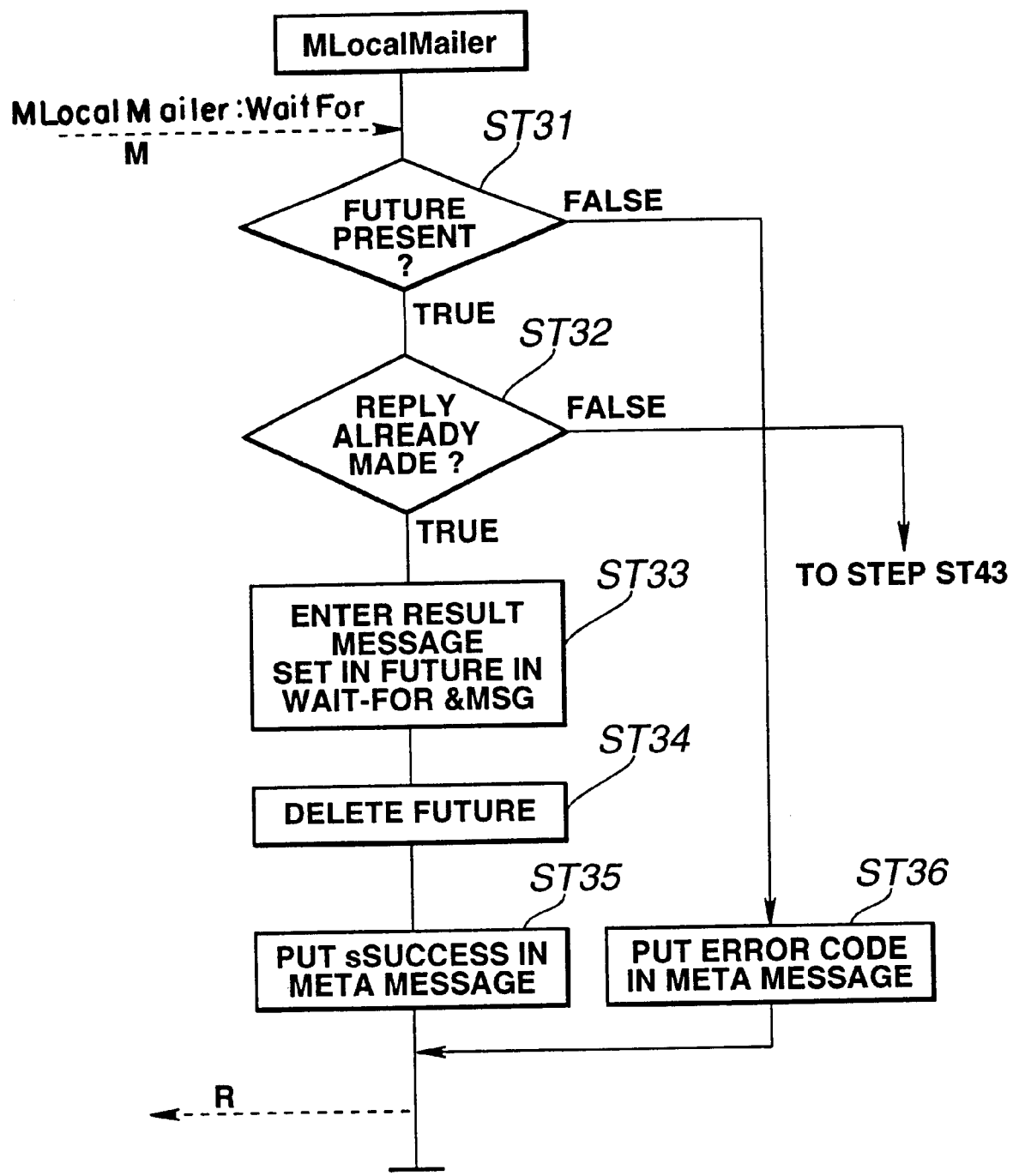
FIG. 11 illustrates the flow of procedure of the relation between the metaobject (mLocalMailer) and Scheduler (in case Reply is executed before WaitFor in WaitFor in the metaspace (mLocal)).
Figure 12:
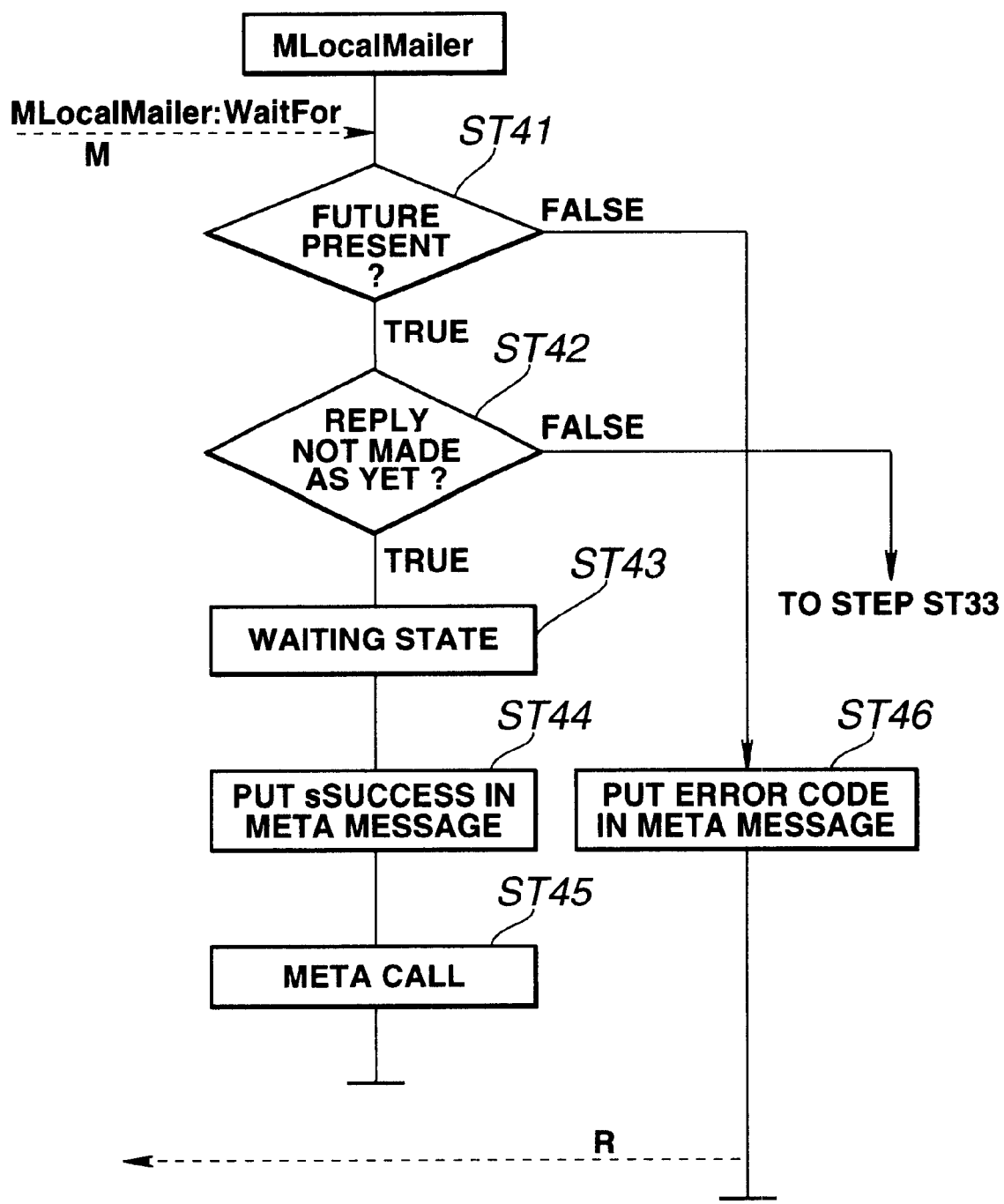
FIG. 12 illustrates the flow of procedure of the relation between the metaobject (mLocalMailer) and Scheduler (in case WaitFor is executed before Reply in WaitFor in the metaspace (mLocal)).

FIGS. 11 and 12 illustrate the procedure for WaitFor. Specifically, FIG. 11 shows a case in which Reply is executed before WaitFor (the instance of FIG. 4), while FIG. 12 shows the reverse case (that is, a case of FIG. 3), in association with the explanation of FIG. 10. The subsequent flow of the base object is not shown for simplicity.

In FIG. 11, the future (Future) is confirmed at step ST31. At step ST32, it is checked whether or not the attribute (isReplyDone) of the future (Future) has been set, that is whether or not the reply (Reply) has been made. If the results of these steps ST31, ST32 are both TRUE, the message is set in the message (&msg) of WaitFor as a result of the result message being set in future (Future) at step ST33. Subsequently, future (Future) is deleted at step ST31 and, at step ST35, delivery end success (sSuccess) is entered in metamessage (MetaMessage). If the result of step ST31 is FALSE, the error code is entered in the MetaMessage at step ST36 to perform R (Resume). If the result of ST32 is FALSE, processing transfers to step ST43 shown in FIG. 12.

In FIG. 12, the future (Future) is confirmed at step ST41 and, at step ST42, it is confirmed whether or not the attribute (isReplyDone) has been set. If the results of steps ST41 and ST42 are both TRUE, the waiting state is set at step ST43. Subsequently, success (sSuccess) is entered into a metamessage (MetaMessage) and sent out at step ST45 from Meta-Call. If the result of step ST41 is FALSE, an error code is entered at step ST46 into the metamessage (MetaMessage) to perform R (Resume). If the result of step ST42 is FALSE, processing transfers to step ST33 of FIG. 11. In the examples of FIGS. 11 and 12, the base object requests the metaobject (MLocalMailer) to set up a waiting state (Wait) until R (resume).

System for Realizing Continuation and Metaspace (mDrive) Communication Mechanism)

In FIGS. 14 to 18, the relation between the metaobject (MDriveMailer) and Scheduler is given by a scenario. Since the metaobject (mDriveMailer) is a metaspace for a device driver, the procedure is slightly more complex than that for the metaobject (mLocalMailer). An illustrative example is a delayed execution table (DelayedExecutionTable). The procedure of Send and Kick in the metaobject (mDriveMailer) is such that, when the object on the metaspace (mDrive) requests Send or Kick, only registration on the delayed execution table (DelayedExecutionTable) is carried out, while delivery of actual messages is done collectively at the time of exiting the method.

Figure 14:
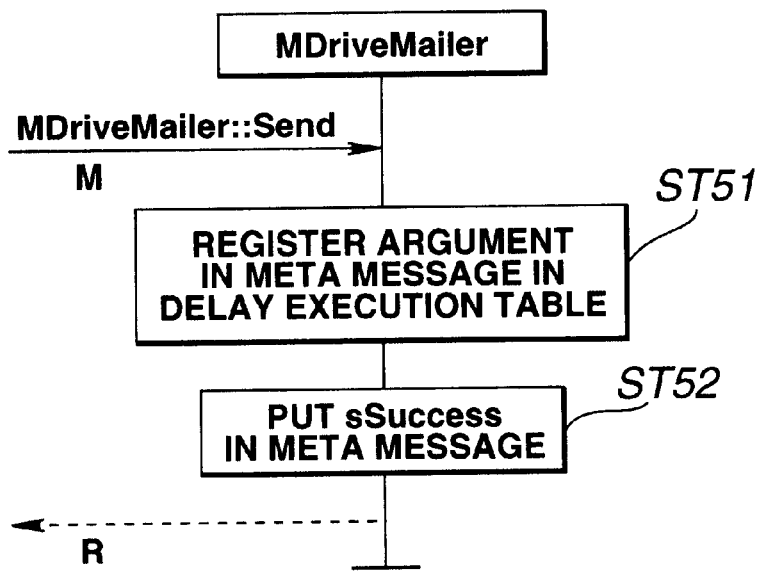
FIG. 14 illustrates the flow of procedure f Send in metaobject (MDriveMailer).

FIG. 14 shows the procedure of Send in the metaobject (mDriveMailer).

Referring to FIG. 14, the Send processing is registered on the delayed execution table (DelayedExecutionTable) at step ST51 as explained above. That is, the argument for delayed execution in the metamessage is registered in the table. When the base object on the metaspace (mDrive) performs Send, the metamessage (MetaMessage) as a subject containing parameters required for Send is registered on the delayed execution table (DelayedExecutionTable). Subsequently, at step ST52, success (sSuccess) is entered in the metamessage (MetaMessage) to perform R (Resume).

The structure of the above-mentioned metamessage (MetaMessage) is briefly explained.

Figure 19:
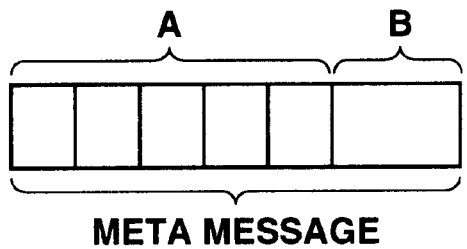
FIG. 19 illustrates the structure of MetaMessage.

Referring to FIG. 19, the metamessage (MetaMessage) has two areas, namely an area A for the information required for executing the API of the metacall (metacall), such as argument, and an area B for error codes. The delay execution table (DelayedExecutionTable) is generated by the object of the mailer (mailer) securing an area for the table in the memory, as in the case of generating future (Future) shown in FIG. 5.

Figure 15:
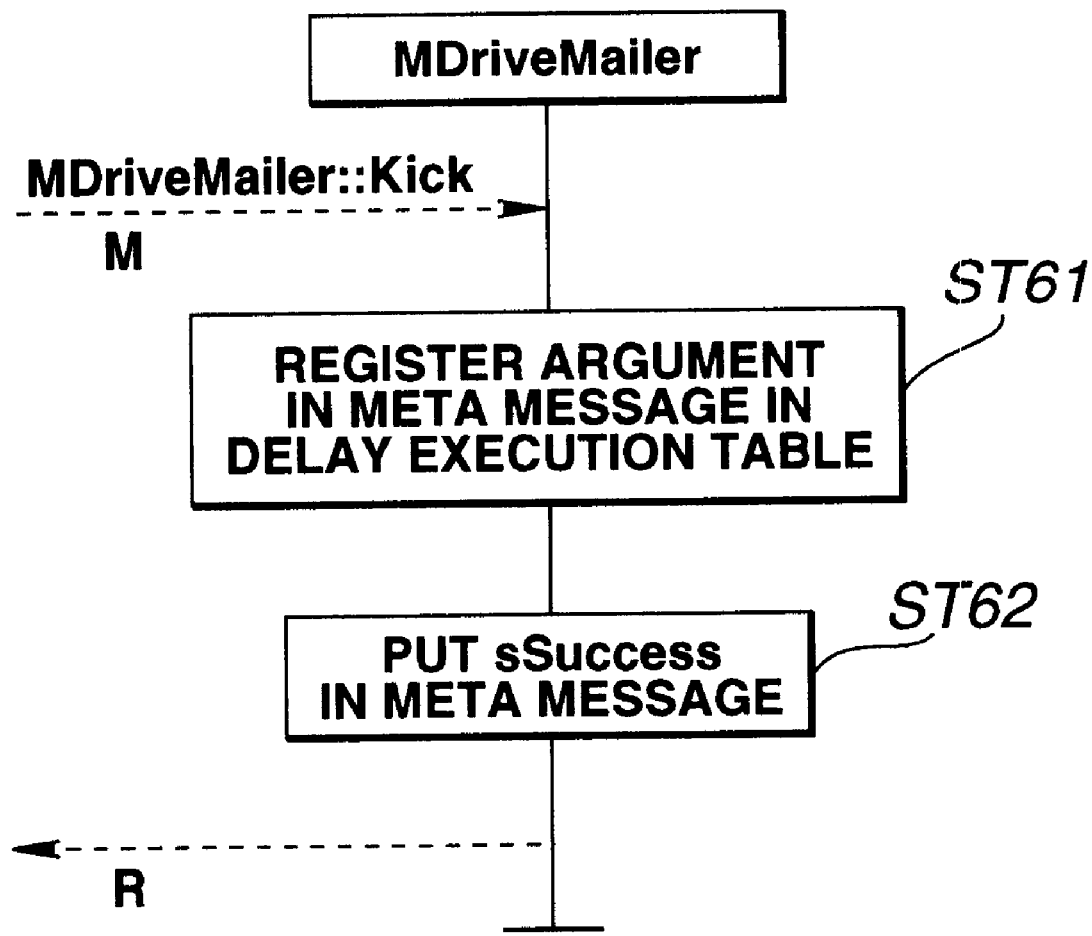
FIG. 15 illustrates the flow of procedure of Kick in metaobject (MDriveMailer).

FIG. 15 shows the procedure of Kick in the metaobject (MDriveMailer).

In this figure, the Kick processing is registered in the delay execution table (DelayedExecutionTable) at step ST61 as in FIG. 14. Subsequently, success (sSuccess) is entered at step ST62 in the metamessage (MetaMessage) to perform R (Resume).

Figure 16:
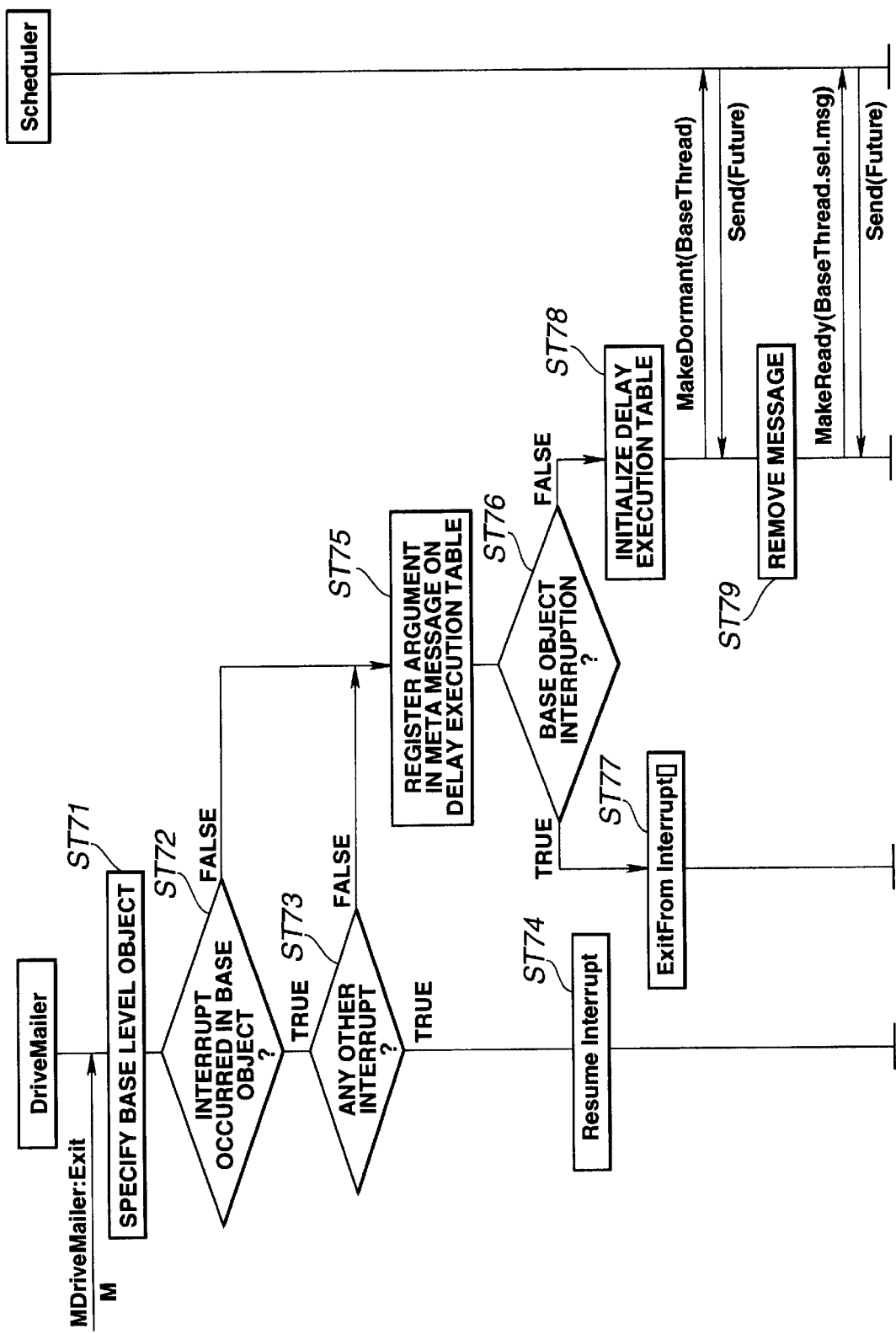
FIG. 16 illustrates the flow of procedure called out when a base object on metaspace (mDrive) terminates processing at the time of termination (Exit) of the metaobject (MDriveMailer).

FIG. 16 shows a process when the base object on the metaspace (mDrive) terminates processing at the time of exiting the metaobject (mDriveMailer). Here, the procedure registered on the delay execution table (DelayedExecutionTable) is executed in the sequence in which processing has been requested and ultimately the procedure is taken for terminating the object method.

In FIG. 16, the step ST71 is first set and the base object which has requested the exit procedure is identified (using, for example, a function GetLast( ).

Figure 20:
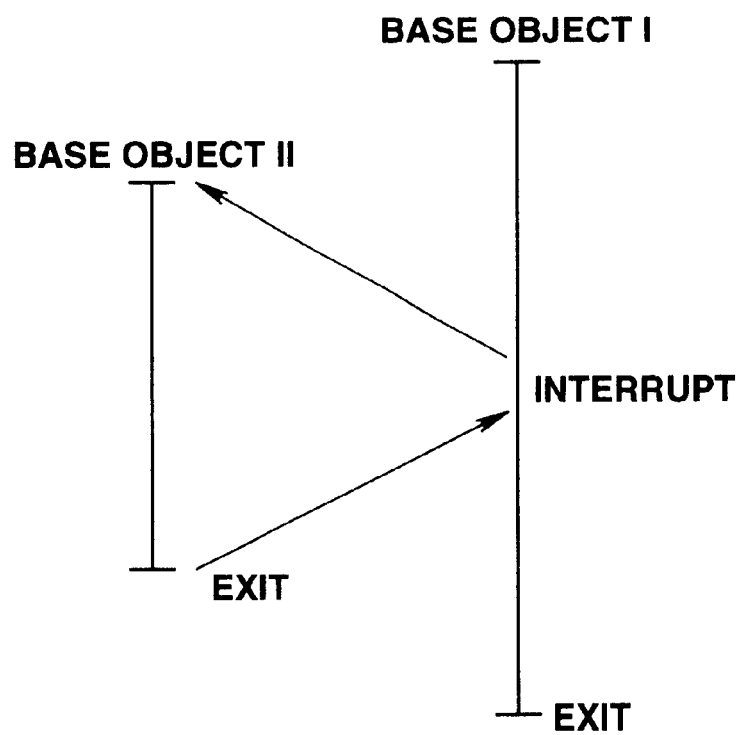
FIG. 20 illustrates the operation n case of interruption of an object II during execution of a base object I.

Next, at step ST72, it is checked whether or not the base object has been started by interruption. That is, it is checked whether the Exit method has been started due to base object interruption. If the method has been started by interruption, it is probable that another interruption is present after the interruption which has caused starting of the method. Referring to FIG. 20, if the base object II has interrupted during execution of the base object I, it is checked at step ST73 whether the present Exit means the Exit of the interruption of the base object II. If the results of check at step ST72 and ST73 are both found to be TRUE, processing reverts at step ST74 to the above-mentioned separate interruption (Resume Interrupt). If the results of check at steps ST72 and ST73 are both FALSE, the procedure registered in the delayed execution table DelayedExecutionTable is performed. As for this processing, FIGS. 17 and 18 show Send and Kick, respectively.

After the processing for the delayed execution table (DelayedExecutionTable) at step ST75 comes to a close, it is again checked at step ST76 whether or not the base object has been started by interruption. This step ST76 is substantially the same as step ST72. If the object has been started by interruption, the procedure for returning therefrom (ExitFromInterrupt( )) is executed to terminate the first interruption. If the object is not started by interruption, the object has been started by usual inter-object communication. At step ST78, the delay execution table (DelayedExecutionTable) is initialized and a message is sent to Scheduler to make it dormant (makeDormant). The argument (Base Thread) is a base object specified at step ST71. At step ST79, the message so far executed is removed from the message cue of the base object.

If the message cue has become void, the processing comes to a close. If the message cue is not void, MakeReady is issued to the scheduler, with the message to be delivered next as an argument, so that the object will again be started by the message given by the argument. This sets the object to a execution possible (ready) state for the next message.

Figure 17:
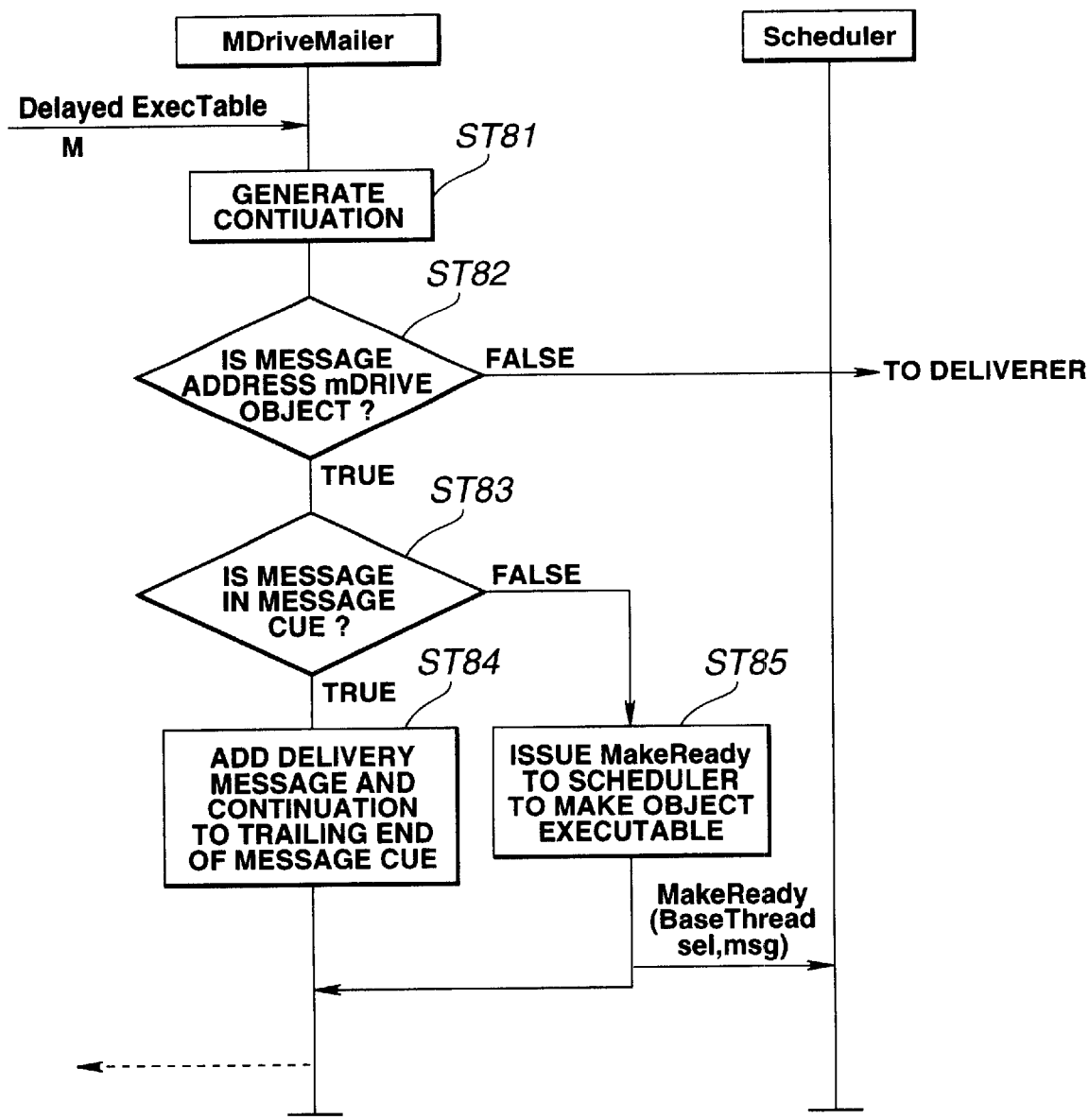
FIG. 17 illustrates the flow of processing the procedure registered in a delay execution table (DelayExecutionTable) (in case of Send of the metaobject (MDriveMailer).
Figure 18:
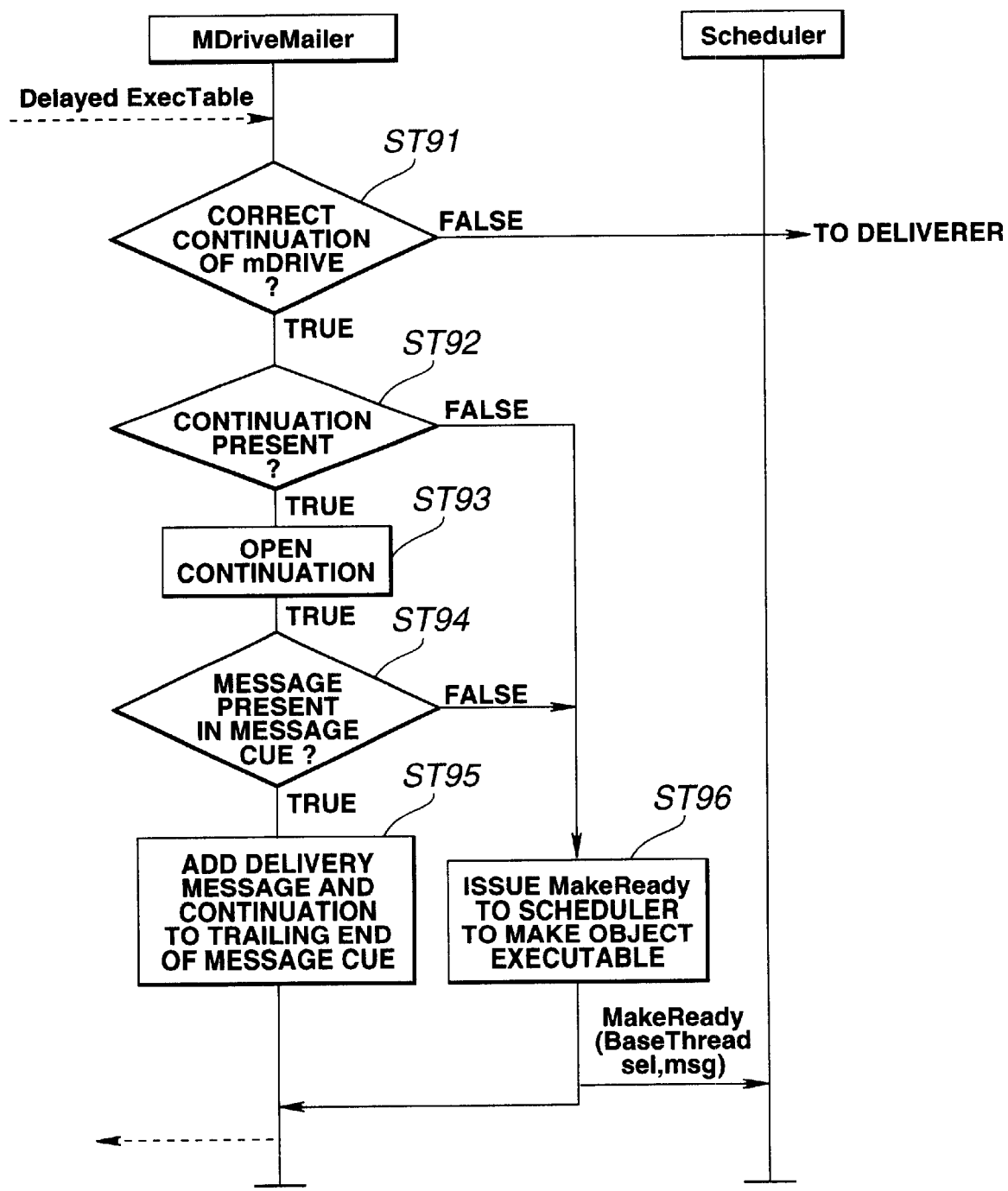
FIG. 18 illustrates the flow of processing the procedure registered in a delay execution table (DelayExecutionTable) (in case of Kick of the metaobject (MDriveMailer).

FIGS. 17 and 18 show a scenario for processing one of the procedures registered in the delay execution table (DelayedExecutionTable). If 10 are issued to the table, for example, 10 operations are carried out. The contents of request to the Scheduler by the presence or absence of the message are similar to those in the case of the metaobject (MLocalMailer).

In case of Send in the metaobject (MLocalMailer) in FIG. 17, Continuation is first generated at step ST81.

At the next step ST82, it is checked whether the address of the message is the metaspace (mDrive). If the result of check is FALSE, a metaobject (Deliverer) is asked to perform processing and then takes over tag communication. At step ST83, the state of the message cue of the object of the address of delivery of a message (ActiveMessage) is checked. If there is no message in the message cue, the object is in the resting state (dormant if the Scheduler takes over supervision). Thus, at step ST85, MakeReady is issued to the Scheduler to set the execution possible state of the object or to set the execution possible state of the object if the Scheduler is in the supervising state.

If, at step ST82 and ST83, the results of check are TRUE, the message has already been delivered to the object of destination so that the object is in the execution possible state, in the course of execution (RUNNING) or suspended state. Thus, at step ST84, the corresponding message is entered in the trailing portion of the message cue to terminate the processing. At this time, Continuation corresponding to the message transmission and a TID for specifying it, as later explained, is also supervised in the message cue.

In case of Kick of the metaobject (MDriveMailer) in FIG. 18, it is checked at step ST91 whether or not Continuation as given is Continuation of the metaobject (MDriveMailer). If the result of check at step ST91 is TRUE, the presence of Continuation is checked at step ST92. If Continuation is confirmed, it is opened at step ST93 and attributes in the Continuation (address, method or message) are checked so that Send is carried out accordingly. At the next step ST94, the message is confirmed. At step ST95, the message is entered in the last portion of the message cue to terminate the processing. At this time, the tag ID (TID) associated with message transmission, as later explained, is simultaneously supervised in the message cue.

If the results of check of the steps ST92 and ST94 are otherwise, MakeReady is issued to the Scheduler at step ST96 to set the execution possible state of the object. The steps ST94, ST95 and ST96 are functions similar to those of the steps ST83, ST84 and ST85. If the result of check at step ST91 is FALSE, this case is tantamount to the case of having communication with other metaspaces by a communication mechanism employing the tag and the metaobject is asked to perform processing (Deliverer).

Basic Explanation of the Communication Mechanism Employing Tag

For having inter-object communication, it is necessary to achieve synchronization with execution of other methods or reception of a reply besides simple message transmission. At this time, Future and Continuation are required. The data structure controlling synchronization and parallelism required in communication between plural objects, such as future or continuation in the present embodiment, is termed a tag. The data structure is of a structure such as Structure in the C-language or PASCAL or Class in C++. This tag relates different structures with a common data structure. This common data structure is configured for including an identifier (attributes: such as ExecSpaceID mailer), for distinguishing these different data structures. The common data structure is also configured for including an identifier (attributes: such as longword timeStamp) for distinguishing data structures of the same type as will be explained in detail with reference to FIG. 21. The ID necessary for distinguishing the tags is termed tagID (TID).

For tag attributes, tag types are required. The tag type needs to be able to specify in which environment the tag is used. However, the tag type need not be able to achieve global recognition. It is sufficient if, in case the tag type cannot be identified, the tag type is identified by inquiring another independent object capable of specifying the tag type.

Taking an example of future (Future) and continuation (Continuation) in the metaspace (mLocal) and metaspace (mDrive), the communication between different metaspaces employing tags is explained. In the present embodiment, it is assumed that the object A and the object B are present in the metaspaces (mLocal) and (mDrive) as discussed above, respectively, and the following methods are defined.
Object A
Method A1 (A::A1)
Object B
Method B1 (B::B1)
Method B2 (B::B2)

The basic operation of the communication between different metaspaces employing tags will be explained for the following two cases.
1. The object A (method A1 (A::A1)) effects Send and WaitFor (Send+WaitFor) for the method B1 (B::B1).
2. The object B (method A1 (A::A1)) effects Send and WaitFor for the method A1 (A::A1) and designates Send for the method A1 (A::A1) and designates the method B2 (B::B2) as a continuous method.

In Case the Object A (method A1 (A::A1)) Effects Send and WaitFor (Send+WaitFor) for the method B1 (B::B1)'

The method A1 (A::A1) executes Send (object B, method B1, message (msg), function sizeof(msg) and future ID (futureID)). At this time, the metaobject (mLocalMailer) for performing this processing generates future (Future). It is sufficient if future (Future) meets the following conditions:

The future (Future) needs to be a unique subject capable of identifying the tag ID, the tag type indicates the future (Future) of the metaspace (mLocal), and the future (Future) has attributes of the future (Future) shown in FIG. 6.

The metaobject (MLocalMailer) requests the metaobject (MDriveMailer) to deliver the message (msg) to the object B by some means, while also requesting starting the method B1 (B::B1). At this time, the tag ID capable of specifying the future (Future) is simultaneously delivered. The future ID (futureID) is received for specifying the future subsequently. Here, the variable of the type is future ID (futureID). This ID is conceived to map the tag ID in meeting with the design statements of the metaspace (mLocal).

The object B cannot or should not know from where the message has been delivered when the method B1 (B::B1) is started by its message (msg). This is required in the realization of a transparent inter-object communication. When the method B1 (B::B1) is started, Continuation is started simultaneously with the message (msg). The continuation (Continuation) is handled as a type (continuation ID (contID). The variable is contID. This variable identifies the same tag as the previous futureID.

With progress of execution of the method B1 (B::B1), Kick(contID) is executed. At this time, the metaobject (MDriveMailer) checks the tag type that can be specified by the continuation ID (ContID). At this time, there are two possibilities from the viewpoint of the tag ID management system.
1. A system in which a metaobject (MDriveMailer) can recognize that the tag type identifiable with continuation ID (contID) is the future (Future) of metaspace (mLocal) (tag ID management system (1)).
2. A system in which the metaobject (MDriveMailer) cannot recognize the tag type identifiable with continuation ID (contID) (tag ID management system (2)).

In the former system, the metaobject (MDriveMailer) can directly deliver tagID to the metaobject by some means. If the tagID is delivered, the metaobject (MLocalMailer) can perform processing in the same way as when the reply (Reply) is performed on the metaspace (mLocal). That is, for the future (Future) corresponding to tagID (=future ID (futureID)), execution of the method A1 (A::A1) can be re-initiated in the same way as the scenario shown in FIG. 10, or the reply message can be transiently preserved in the future (Future).

In the latter case, the following method may be conceived as a method for delivering the tagID to the metaobject (MLocalMailer).
1. There is another object supervising a tag type. When given the tagID, this object searches the type of the tagID and prepares a method which shows a mailer as an API capable of processing the tag. The metaobject (MDriveMailer) exploits this method to know that it suffices to deliver the tagID to the metaobject (MLocalMailer) and directly delivers the tagID to the metaobject (MLocalMailer) (tag ID management system (2A)).
2. There is another object supervising a tag type and the object directly delivers the given tagID to the mailer (Mailer) capable of processing the associated tag(tag ID management system (2B)).

In these cases, the tagID is ultimately delivered to the metaobject (MLocalMailer) in order to re-start execution of the method A1 (A::A1) in the same way as the scenario shown in FIG. 10 or preserve the reply message transiently in the future (Future). 'The object B (method A1 (A::A1) effects Send and WaitFor for the method A1 (A::A1) and designates the method B2 (B::B2) as a continuous method.'

The method B1 (B::B1) performs Send (object A, method A1, message (msg), function (sizeof(msg)), method B2 and message (contMsg)). At this time, the metaobject (MDriveMailer) carrying out this procedure generates continuation (Continuation), which satisfies the following requirements:

That the continuation (Continuation) is a unique subject that can be identified by the tagID;

that the tag type indicates that it is a continuation (Continuation) of the metaspace (mDrive); and that there is the attribute of the continuation (Continuation) shown in FIG. 8.

The OS including the metaobject (MDriveMailer) delivers the message (msg) to the metaobject (mLocalMailer) by some means and requests starting the method A1. The tagID capable of identifying the continuation (Continuation) is delivered simultaneously.

In the usual inter-object communication of the metaspace (mDrive), this tagID is handled as the continuation ID (contID). However, in this case, it is unnecessary to handle the metaobject (MLocalMailer) as the continuation ID (contID), such that it is handled as tagID. If, in the usual inter-object communication of the metaspace (mLocal), a message is delivered for starting a method, a tag ID delivered from the metaobject (MDriveMailer) is associated with it, in the same way as the future (Future) or the future ID (futureID)) is associated with it.

With progress of execution of the method A1 (A::A1), the reply (Reply( ) or Reply (Reply Msg)) is executed. At this time, the metaobject (MDriveMailer) checks the tag ID associated when the method A1 (A::A1) is started, and checks the tag type identified by the tag ID. In this case, in the same way as when having communication from the object A on the metaspace (mLocal) to the object B on the metaspace (mDrive), there are two possibilities from the viewpoint of the tagID management system, namely
1. a system in which a metaobject (MLocalMailer) can recognize the tag type identifiable as being continuation (Continuation) of metaspace (mLocalMailer) (tagID management system (1)).
2. A system in which the metaobject (MDriveMailer) cannot recognize the tag type identifiable with tag ID (contID) (tagID management system (2)).

In both of these systems, the tagID can be delivered to the metaobject (MDriveMailer) by some means as in the case of communication from the object A on the metaspace (mLocal) to the object B on the metaspace (mDrive). On reception of the tagID, the metaobject (MDriveMailer) performs processing as in the scenario shown in FIG. 18. That is, the continuation (Continuation) associated with the tag ID is first opened for obtaining the continuous method and the continuous message. Responsive to the state of the message cue of the object to which the continuous method should be delivered (creator of Continuation), the scheduler is accessed for ultimately starting the method B2 (B::B2).

'Instance of Realization of a Communication Mechanism in the Present Embodiment Employing Tag'

In the present chapter, a system of realization enabling communication with transparency of objects present in the metaspace (mLocal) and in the metaspace (mLocal) using the tag is explained. It is assumed that there exist only two communication mechanisms, namely a metaspace (mLocal) communication mechanism and a metaspace (mDrive) communication mechanism as different communication mechanisms.

Future, Continuation and Tag

In the OS, Future in metaspace (mLocal) and continuation in metaspace (mDrive) can be handled as tags. In this case, it is necessary for the OS to discern whether the tag (Tag) is future (Future) or continuation (Continuation). As a type for making distinction, the ID of the mailer (Mailer) of API is used. If the mailer ID used as a tag type is metaobject (mLocalMailer) or a metaobject (MDriveMailer), the tag can be identified to be future (Future) or continuation (Continuation), respectively.

Figure 21:
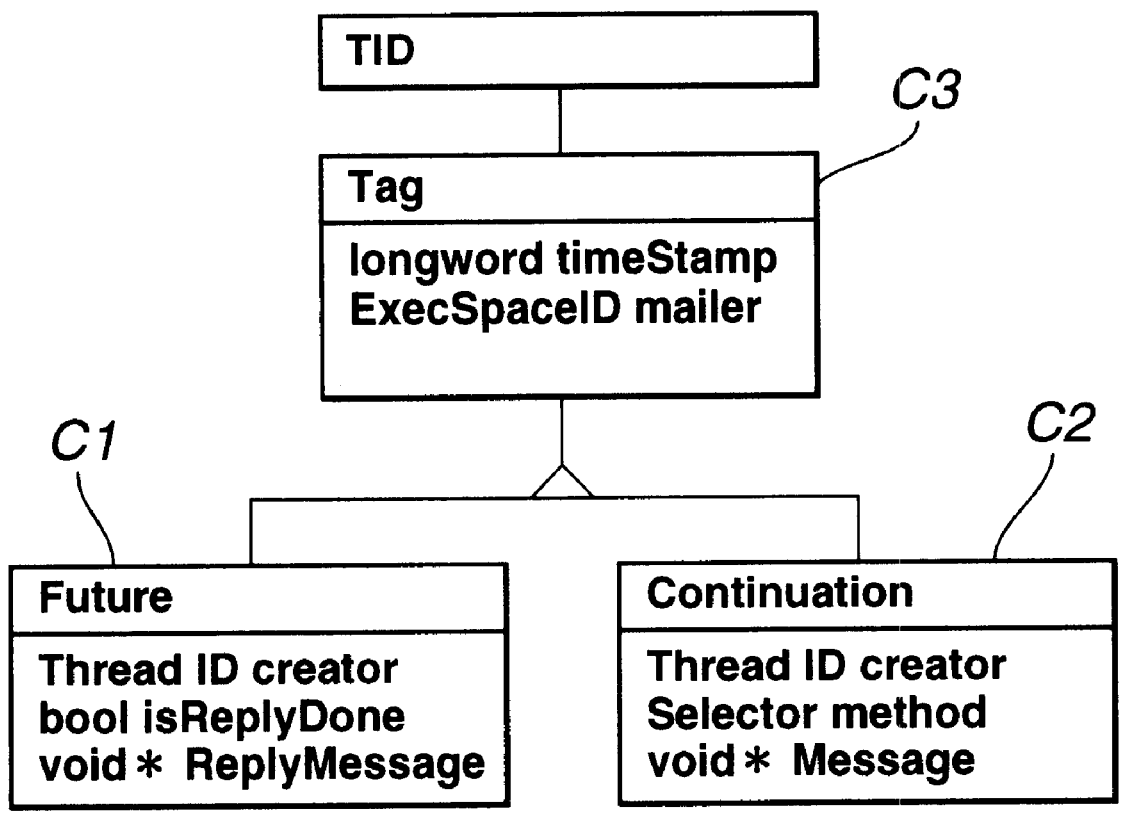
FIG. 21 illustrates the relation between Tag, Future and Continuation and that between tag (Tag) and the tag ID (TID) by an object model of the OMT method.

FIG. 21 shows the relation between Tag, Future and Continuation and that between tag (Tag) and the tag ID (TID) by an object model diagram of the object modeling method (OMT method). The class future C1 and the class continuation C2 can be defined as being sub-classes derived from the class tag C3. The tag (Tag) employs a site of execution (ExecSpaceID) as an identifier ID. In this case, the site of execution ID (ExecSpaceID) is used as being equivalent to the object-identifying ID. The tag (Tag) can be identified as a tag ID (TID). The time stamp contained in the tag (Tag) is used for assuring that the tag (Tag) specified using the tagID (TID) is unique with respect to the time axis. If future (Future) and continuation (Continuation) can be identified, the time stamp need not necessarily be employed.

In the metaspace (mLocal) communication mechanism and in the metaspace (mDrive)communication mechanism, future ID (futureID) and the continuation ID (ContID) are used for identifying future (Future) and continuation (Continuation), respectively. If the tag (Tag) is introduced, these can be identified as being tagID (TID) that can be specified in common.

In the present embodiment, type re-definition is carried out in a header file defining an interface (MLocal.h and Mdrive.h) so that the programmer can directly use the interface furnishing the metaspace (mLocal) or metaspace (mDrive). That is, in the header file of the metaspace (mLocal), the future ID (futureID) can be re-defined in the tagID. This can be shown by, for example, the C-language or C++ definition method, as typedef TID futureID; where typedef means definition of a new type. In the continuation header file of a header file Mdrive.h of the metaspace (mDrive), the continuationID (contID) is re-defined in tagID. This may similarly be shown as typedef TID ContID.

TagID Delivery System and Object Delivering the tagID

In the present embodiment, the above-mentioned tagID management system (2B) is applied. As an object supporting the communication mechanism between different metaspaces, Deliverer is introduced. The object mainly has two interfaces (methods or APIs).

One of these, that is an interface sErrorDeliverObject, delivers the message (msg) to a designated object (destination) (represented by the argument object ID (OID) and address method (sel)), and requests the mailer (Mailer) of the metaspace, where the object (destination) exists, for ultimately starting the method of the object (destination). This interface sErrorDeliverObject is further used when the object (destination) responds to the tagID (TID) delivered as one of the arguments.

The other interface (sErrorDeliverTag) delivers a tagID (TID). The object (deliverer) checks the type of the tag (Tag) corresponding to the tagID (TID) to know to which mailer (Mailer) the tagID (TID) can be sent. If necessary, the interface (sErrorDeliverTag) also delivers the reply message (replyMsg).

Among the methods by which to know the mailer (Mailer) of the metaspace where the object of destination (Deliverer destination) exists, there are
1. a method in which an object when generated is pre-registered in an object (deliverer) and the object (deliverer) controls the contents using a table or the like, and
2. a method in which a metaspace to which belongs an object or some ID that can identify the metaspace is contained in a data structure which can be directly traced from the object. In the present embodiment, the latter method is used.

Actual Communication between different Metaspaces

As for the communication between the difference metaspaces, the following two cases of communication between two different metaspaces (inter-object communication present in different metaspaces) are conceived.
A. The case of communication in which the metaspace (mLocal) object has communication with the metaspace (mDrive) object or has such communication to receive the reply; and
B. The case of communication in which the metaspace (mDrive) has communication with the metaspace (mLocal) object or has such communication to receive the reply.

Figure 22:
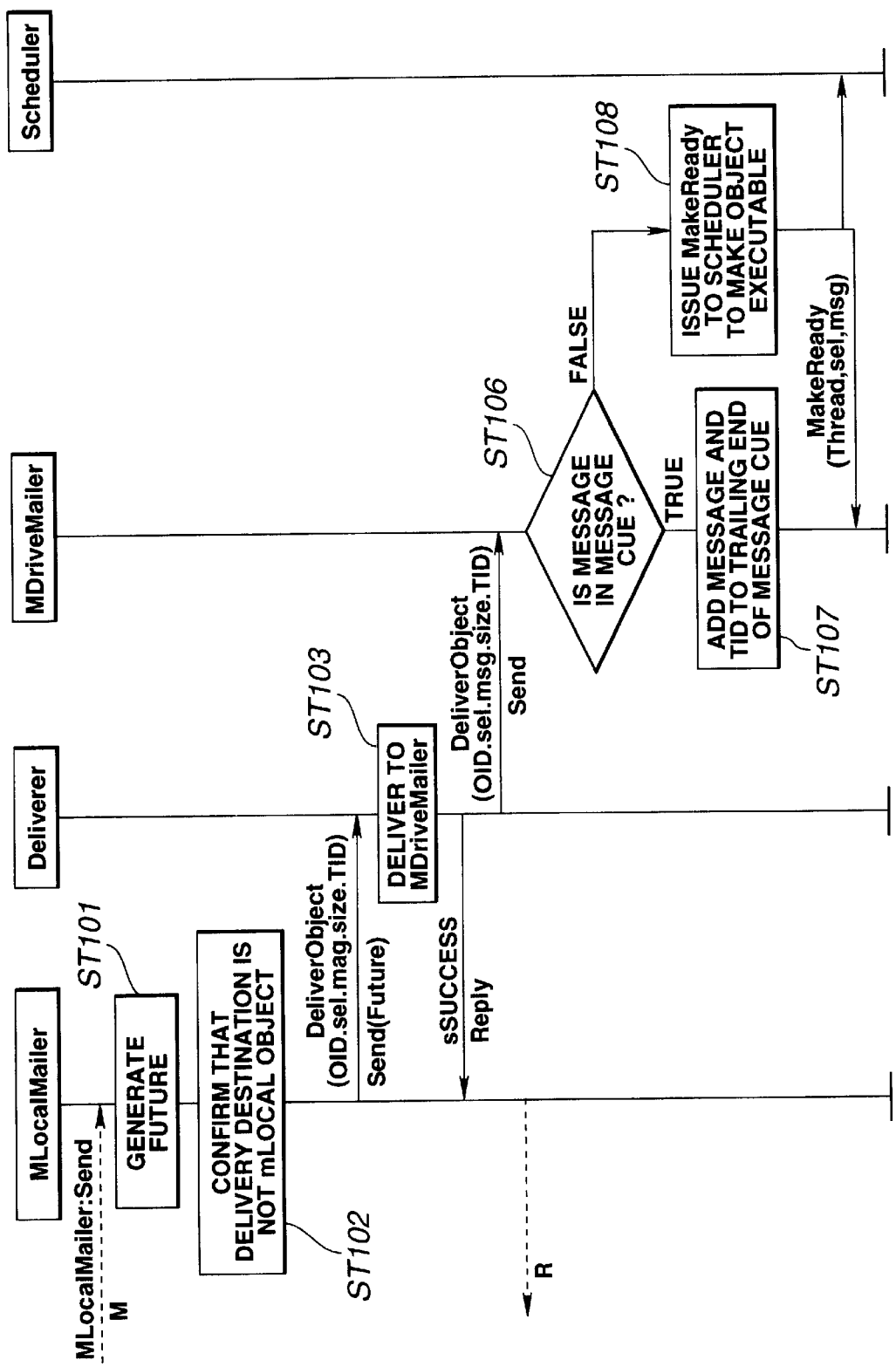
FIG. 22 illustrates the flow of a forward path in case of communication between different metaspaces via object (deliverer) (in case of communication from the metaspace (mLocal) to a metaspace (mDrive)).
Figure 23:
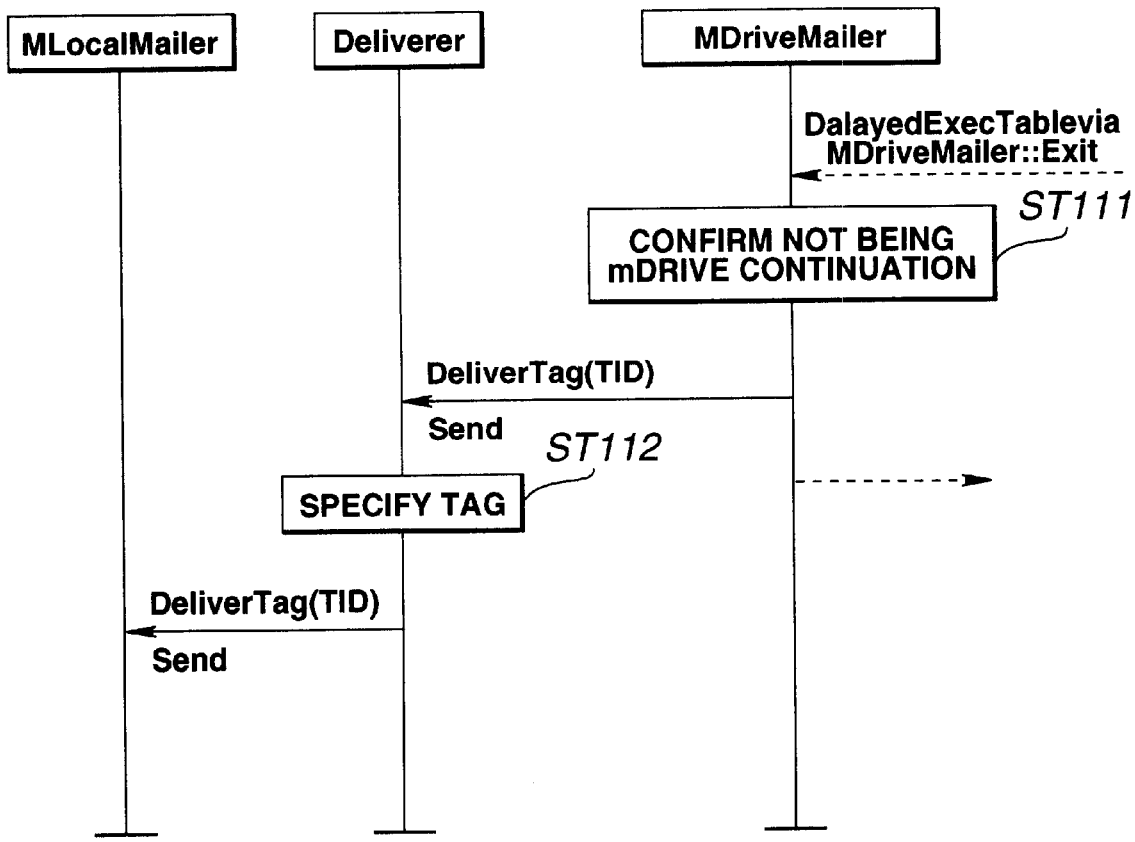
FIG. 23 illustrates the flow of a backward or return path in case of communication between different metaspaces via object (deliverer) (in case of communication from the metaspace (mLocal) to the metaspace (mDrive)).
Figure 24:
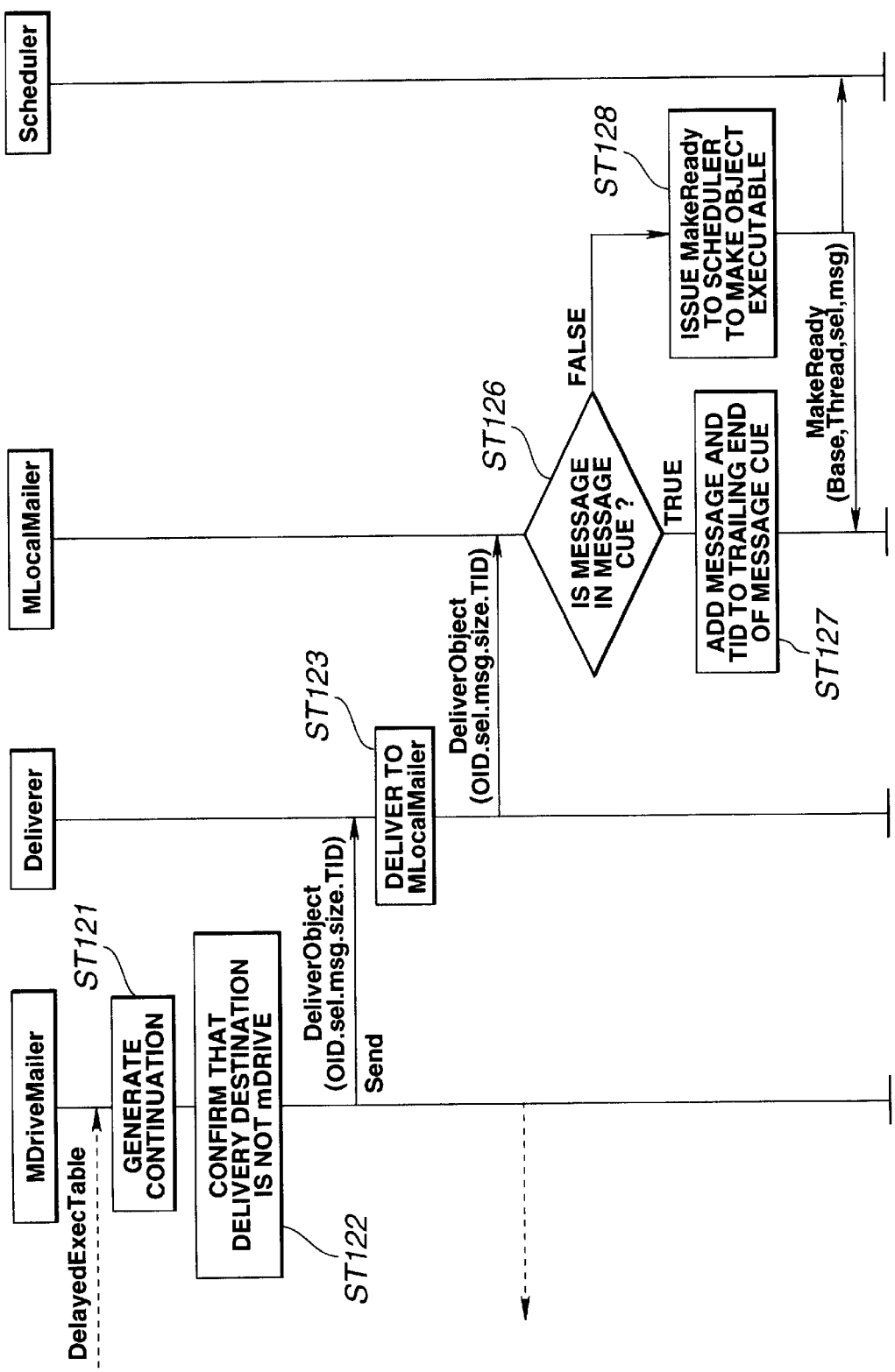
FIG. 24 illustrates the flow of a forward path in case of communication between different metaspaces via object (deliverer) (in case of communication from the metaspace (mDrive) to the metaspace (mLocal)).
Figure 25:
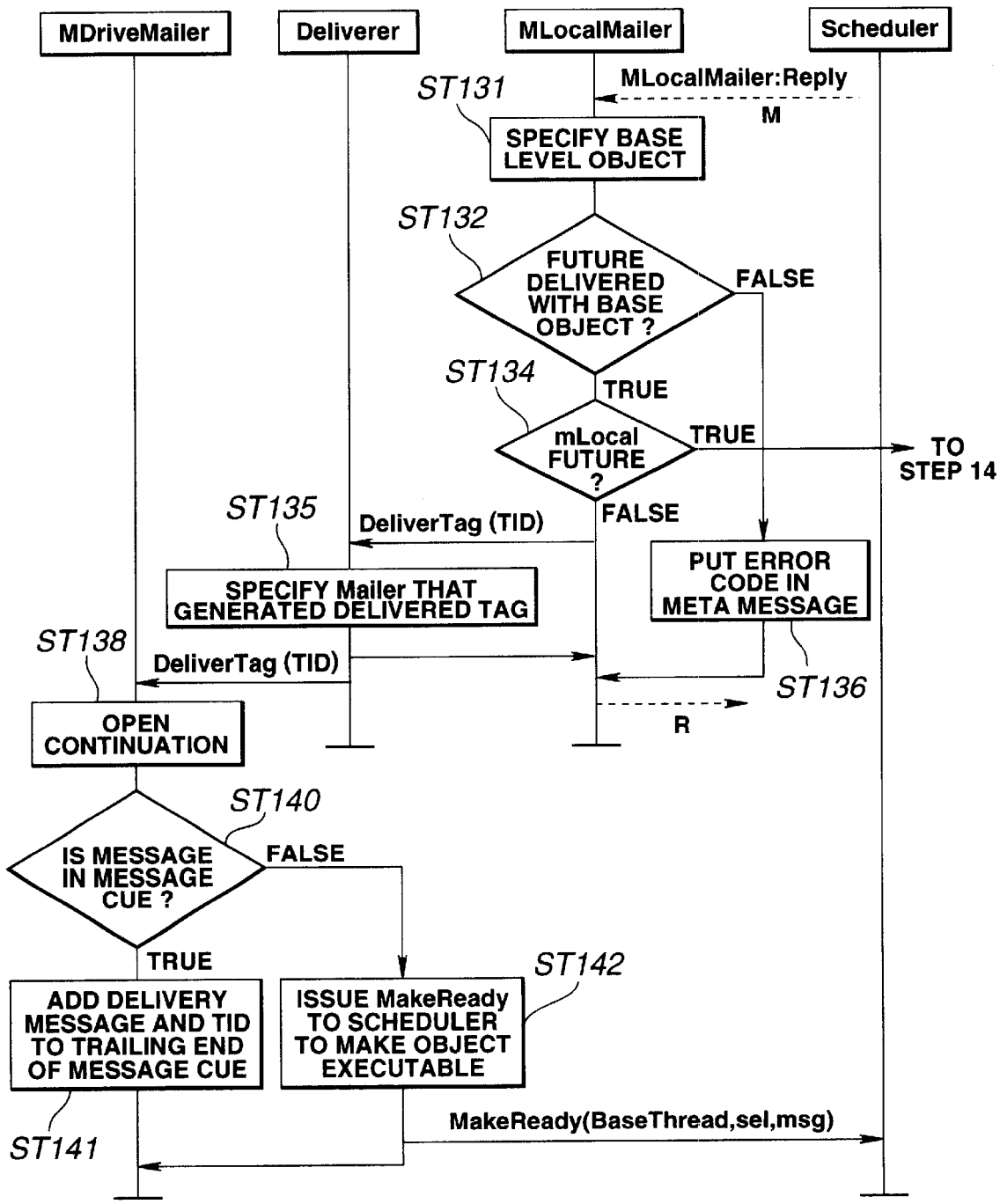
FIG. 25 illustrates the flow of a backward or return path in case of communication between different metaspaces via object (deliverer) (in case of communication from the metaspace (mDrive) to a metaspace (mLocal)).

For the cases of having communication between different metaspaces metaspace (mLocal) and metaspace (mDrive) via object (Deliverer), FIGS. 22 and 23 show the former case of communication A, while FIGS. 24 and 25 show the latter case of communication B.

Referring to FIG. 22, the processing from acceptance of the request for procedure of Send of the base object by the metaobject (MLocalMailer) until generation of future (Future) (step ST101) is similar to that shown in FIG. 9. However, the future (Future) is generated as a tag sub-class.

At step ST102, the destination delivery of the message is confirmed. If the destination of delivery of the message is not the metaspace (mLocal) object, a message is sent to the method (DeliverObject) of the object (Deliverer).

Since the object (Deliverer) can know the destination of delivery by the argument of the method (DeliverObject), it is further delivered to its mailer (mDriveMailer), as shown at step ST103. The procedure shown at step ST106 and following steps (steps ST106, ST107 and ST108) after the delivery has been requested by the metaobject (mDriveMailer) via the interface (DeliverObject) are similar to the procedure (steps ST83, ST84 and ST85) which the metaobject (MDriveMailer) performs for Send at the time of Exit. However, in this case the tagID (TID) is added to the message cue at step ST107.

FIG. 23 shows the procedure when the tag ID (TID) delivered to the metaspace (mDrive) is handled in the metaspace (mDrive) as the continuation ID (ContID) and is kicked.

Referring to FIG. 23, the metaobject (mDriveMailer) knows that the continuation ID (ContID) designated at the time of processing for Kick at Exit at step ST111 is not the continuation of the metaspace (mDrive). Thus, the tag ID (TID) is delivered using the tag (DeliverTag) of the object (Deliverer).

The object (Deliverer) identifies the tag (Tag) from the tag ID (TID) at step ST112 to know from the attribute (ExecSpaceID mailer) that the tag (Tag) is the tag of the metaobject (MLocalMailer) (future (Future) of the metaspace (mLocal))). Thus the tag ID (TID) is delivered to the metaobject (MLocalMailer).

The procedure since the time the metaobject (MLocalMailer) accepted the tag ID (TID) is similar to the reply (Reply) of the metaobject (MLocalMailer) of FIG. 10. The subsequent procedure is the steps ST14, ST15, ST16, ST17 and ST20 if the result of step ST13 is TRUE.

FIGS. 24 and 25 show a scenario in which a message is transmitted from the metaspace (mDrive) to the metaspace (mLocal) and a reply is received. The operation of the object (Deliverer) is similar to that shown in FIGS. 22 and 23.

That is, in the example of FIG. 24, the procedure since the time the metaobject (MLocalMailer) accepted the request for procedure of Send of the base object until the time of generation of continuation (Continuation) is similar to that shown in FIG. 17.

At step ST122, the destination of delivery of the message is confirmed. If the destination of message delivery is not the metaspace (mDrive) object, the message is sent to the method (DeliverObject) of the object (mLocal).

Since the object (Deliver) can know the destination of delivery, the message is further delivered to its mailer (Mailer) as shown at step ST123. The procedure after delivery request for the metaobject (MLocalMailer) via the interface, as shown at steps ST126, ST127, ST128 is similar to the procedure which the metaobject (MLocalMailer) performs for Send on Exit of the metaobject (MLocalMailer) of FIG. 18 (steps ST94, ST95 and ST96).

On the other hand, the metaobject (MLocalMailer) knows at steps ST131 to ST134 that the futureID (futureID) designated at the time of processing for Kick at the time of Exit is not the future (Future) of the metaspace (mLocal) as in steps ST11, ST12 and ST13 of FIG. 10. Thus the tag ID (TID) is delivered using the tag (DeliverTag) of the object (Deliverer). This is the same as the case in which the result of step ST13 is FALSE.

The object (Deliver) specifies from the tag ID (TID) at step ST135 and knows from its attributes that the tag (Tag) is the continuation (Continuation) of the metaspace (mDrive). Thus the tag ID (TID) is delivered to the metaobject (MDriveMailer).

The procedure since the time of acceptance of the tag ID (TID) by the metaobject (MDriveMailer) is similar to the processing (steps ST93, ST94, ST95 and ST96) of the metaobject (MDriveMailer) explained with reference to FIG. 18.

Other Conceivable Systems for Realization

In the present chapter, other conceivable systems for realization of 'the communication mechanism employing the tag' than those so far explained are explained.

'System for Recognizing the Tag type by the TagID'

Figures 26, 27:
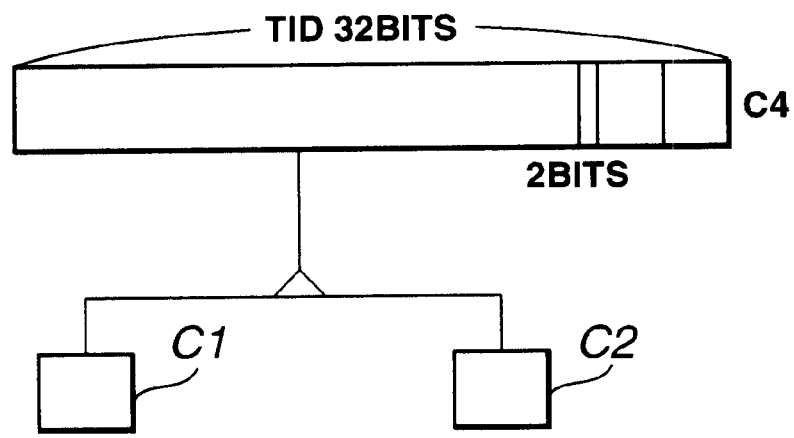
FIG. 26 illustrates an example of a system for verifying tag types by the tag ID.
FIG. 27 illustrates OMT including tag attributes in this tag ID (TID).

The present embodiment has an ID of the mailer (Mailer) as an attribute of the tag (Tag). This enables discrimination of the type of the tag (Tag). Another method is a system of appending to the tag ID the information for recognizing the tag type. If the tag ID is an integer represented by two bits, it may be conceived to use a system in which two lower bits are used for the type of the tag (Tag). FIG. 26 shows an example of the system for verifying the tag type by the tagID. That is, in FIG. 26, if the combination of the lower two bits is 00, the tag ID represents the future (Future) of the metaspace (mLocal). If, on the other hand, the combination of the lower two bits is 01, the tag ID represents the continuation (Continuation) of the metaspace (mDrive). In contrast to FIG. 21, FIG. 27 shows an OMT in which only the tag ID (TID) is generated without using the subject of the tag and the tag attributes are included in this tag ID (TID). In FIG. 27, C1 and C2 are the same as those shown in FIG. 21. In this case, there is no necessity of securing a tag area in the memory, thus saving the memory area. Although the lower two bits are used in the present embodiment, a sole bit or upper or intermediate optional bits may, of course, be used.

Tag Management System

In the present embodiment, the possibility of using the tag management systems (1), (2) and (3) has been shown, as described above. In any of these systems, it has been shown that the tag has a type as its attribute and the mailer (Mailer) checks the type in order to give judgment whether or not at least the Mailer (Mailer) itself can process the tag. In distinction from this embodiment, such a system may be conceived in which the type is not included in the tag attributes and in which the tag that can be processed by the mailer (Mailer) is managed in the inside of the mailer (Mailer).

In this system, if the future (Future) of the continuation (Continuation) is generated by the mailer (Mailer), the information so generated is preserved in a table owned by the mailer (Mailer) itself. If the reply (Reply) or kick (Kick) is delivered by the tag, the mailer (Mailer) scans the table. If the tag can be processed by the mailer (Mailer), the usual operation of the reply (Reply) and kick (Kick) is performed. If otherwise, it is possible to make an inquiry to which mailer (Mailer) the tag can be delivered, as in the tag management system (2A), or to request other objects to continue the succeeding processing.

In this case, an object other than the mailer (Mailer) that can process the tag ID and the associated tag, such as the object (Deliverer), needs to be coped with by, for example, a table, if there lacks the type as the tag attribute.

Figure 28:
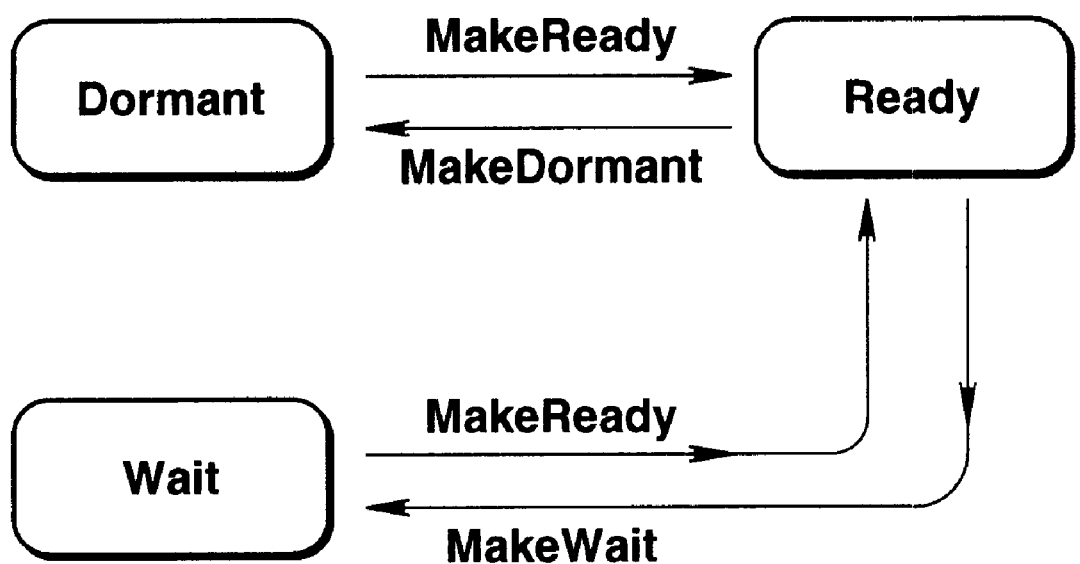
FIG. 28 shows a status transition diagram of Thread.

FIG. 28 shows the state transition diagram of the thread (Thread) in the Scheduler. An illustrative design statement of the Scheduler is now shown.

Each thread (Thread) presents each state for execution control. The Scheduler supervises state transition of these threads (Threads) and determines which thread is executed next based on the attribute such as priority order.

The dormant state (Dormant) indicates that there is nothing to be executed in connection with the thread (Thread). The message (message) at this time is in the reception possible state.

The execution possible (Ready) state indicates that the thread (Thread) is in the execution possible state and is entered (enqueued) in the queue for threads (Threads) in the execution possible state (ReadyQueues) in the Scheduler. The object associated with the thread (Thread) in the execution possible (Ready) state is invoked by M (Meta Computation).

The executing state (Running) indicates that the thread (Thread) is running.

The waiting state (Wait) indicates the execution interrupting state and is generated when WaitFor is issued before Reply by the above-mentioned communication function of the metaspace (mLocal).

Several examples of the interface (API) are hereinafter explained.

sError MakeReady (thread, sel, msg)

This interface (API) is used by a mailer metaobject, such as the above-mentioned metaobject (MLocalMailer), for sending the message (msg) to the method designated by the selector (sel) of the address object linked by the thread (Thread).

The scheduler (Scheduler) causes transition of the state of the thread (Thread) from the dormant state (Dormant) to the execution possible state (Ready) to enter (enqueue) the state in the Ready Queues.

The address object is invoked when the thread (Thread) is scheduled, that is when the thread (Thread) in the execution possible state (Ready) is executed by the scheduler (Scheduler).

Meanwhile, sError indicates the state of the result of execution and, if MakeReady has operated correctly, it returns a return value (sSuccess) indicating that effect. If otherwise, sError returns various errors.

sError MakeReady (Thread)

This interface (API) is used by a mailer for starting execution of the thread (thread). The scheduler (Scheduler) causes transition of the state of the thread (Thread) from the waiting state (Wait) to the execution possible (Ready) state to enter (enqueue) it in the ready queues(Ready Queues). This interface is used when an object which has issued WaitFor by the above-mentioned metaspace (mLocal) communication function and is in the waiting state (Wait) receives the result message by the reply (Reply) issued by another object so as to be set to Ready state.

sError MakeWait (Thread)

This interface (API) is used for stopping execution of the thread (Thread). The scheduler (Scheduler) causes transition of the thread (Thread) from the execution possible state (Ready) to the waiting state (Wait) to remove it from the queues in the Ready Queues (dequeue). Meanwhile, each mailer is not in need of invoking this interface for stopping execution of the base object. It is because the state has already been changed to the waiting state (Wait) when the base object invokes the mailer using the above-mentioned M (Meta Computation).

sError MakeDormant (Thread)

This interface (API) is used by the mailer for stopping execution of the thread (Thread). The scheduler (Scheduler) causes transition of the thread (Thread) from the execution possible state (Ready) to the dormant state (Dormant) to remove it from the queues in the Ready Queues (dequeue).

Meanwhile, the state of the object as viewed from the mailer, or the associated thread, is classified into a dormant state (Dormant), execution possible state (Ready) and waiting state (Wait). It is because the mailer is not in need of knowing which of plural objects in the execution possible state is running on the CPU.

What is claimed is:

1. A data communication method for realizing a function of software in its entirety by communication between a first object and a second object, wherein said first object and said second object include said function of said software built into a module, comprising the steps of:

generating a tag for identifying an operating environment of said second object in which the tag is used and for controlling synchronization of parallel execution of said communication between a plurality of objects existing in a plurality of different operating environments; and transmitting said tag to said second object along with a communication message, wherein said tag includes one of a first identifier indicating a memory for storing a result of processing of said second object and a second identifier indicating a third object and information to be delivered to said third object.

2. The data communication method as set forth in claim 1, wherein when generating said tag, at least a tag ID for identifying said tag and an attribute specifying a tag type are generated.

3. The data communication method as set forth in claim 1, wherein one of said plurality of objects is provided for supervising a tag type.

4. The data communication method as set forth in claim 2, wherein one of said plurality of objects is provided for supervising said tag type.

5. The data communication method as set forth in claim 2, wherein said tag ID is delivered by one of said plurality of objects along with said communication message.

6. The data communication method as set forth in claim 5, wherein said one of said plurality of objects delivering said tag ID determines a destination of delivery based on said tag type.

7. The data communication method as set forth in claim 6, wherein said one of said plurality of objects delivering said tag ID has a table of said destination of delivery and said tag type.

8. The data communication method as set forth in claim 1, wherein a tag ID for at least specifying information for identifying said tag and an attribute specifying a tag type is generated.

9. The data communication method as set forth in claim 8, wherein said tag type is represented using a part of a plurality of bits of said tag ID formed by said plurality of bits.

10. A data communication method for realizing a function of software in its entirety by communication between a a first object, wherein said first object and said second object include said function of said software built into a module, comprising the steps of:

generating a third data structure having an identifier for distinguishing between a first data structure generated by said first object and a second data structure generated by said second object when having communication between said first object and said second object existing in different operating environments; and transmitting data pertaining to said third data structure along with a communication message from said first object to said second object, wherein said third data structure includes one of a first identifier indicating a memory for storing a result of processing of said second object and a second identifier indicating a third object and information to be delivered to said third object.

* * * * *